(12) United States Patent
Hiroki et al.

(10) Patent No.: US 11,054,858 B2
(45) Date of Patent: Jul. 6, 2021

(54) ELECTRONIC DEVICE

(71) Applicant: SEMICONDUCTOR ENERGY LABORATORY CO., LTD., Atsugi (JP)

(72) Inventors: Masaaki Hiroki, Kanagawa (JP); Daisuke Furumatsu, Kanagawa (JP)

(73) Assignee: Semiconductor Energy Laboratory Co., Ltd., Atsugi (JP)

(*) Notice: Subject to any disclaimer, the term of this patent is extended or adjusted under 35 U.S.C. 154(b) by 0 days.

(21) Appl. No.: 17/083,432

(22) Filed: Oct. 29, 2020

(65) Prior Publication Data

US 2021/0064078 A1   Mar. 4, 2021

Related U.S. Application Data

(63) Continuation of application No. 16/407,448, filed on May 9, 2019, now Pat. No. 10,824,193, which is a
(Continued)

(30) Foreign Application Priority Data

Mar. 13, 2014  (JP) ................................. 2014-050855

(51) Int. Cl.
  *G06F 1/16*   (2006.01)
  *H05K 5/00*   (2006.01)
  *H05K 7/00*   (2006.01)

(52) U.S. Cl.
  CPC ............ *G06F 1/163* (2013.01); *G06F 1/1635* (2013.01); *G06F 1/1643* (2013.01); *G06F 1/1652* (2013.01)

(58) Field of Classification Search
  CPC ...... G06F 1/163; G06F 1/1635; G06F 1/1643; G06F 1/1652
  (Continued)

(56) References Cited

U.S. PATENT DOCUMENTS 6,728,166 B2   4/2004   Grupp
7,460,085 B2   12/2008  Ishii
(Continued)

FOREIGN PATENT DOCUMENTS

CN   001649474 A   8/2005
CN   001747668 A   3/2006
(Continued)

OTHER PUBLICATIONS

International Search Report (Application No. PCT/IB2015/051385) dated Jun. 9, 2015.
(Continued)

*Primary Examiner* — Anthony M Haughton
(74) *Attorney, Agent, or Firm* — Fish & Richardson P.C.

(57) ABSTRACT

A structure suitable for a portable information terminal or a wearable device is provided. In addition, an electronic device having a novel structure that can have various forms is provided. It is preferable that a buffer layer which absorbs a difference in the amount of change in form be provided between adjacent film substrates which overlap with each other. As the buffer layer, a gelled resin material, a rubber resin material, a liquid material, an air layer, or the like can be used. Furthermore, an optical film such as a polarizing film or a color filter may be used as the buffer layer. A plurality of buffer layers may be provided in an electronic device.

12 Claims, 13 Drawing Sheets

Related U.S. Application Data continuation of application No. 15/453,946, filed on Mar. 9, 2017, now Pat. No. 10,289,158, which is a continuation of application No. 14/641,637, filed on Mar. 9, 2015, now Pat. No. 9,594,402.

(58) Field of Classification Search
USPC .................. 361/679.01, 679.02, 679.03
See application file for complete search history.

(56) References Cited

U.S. PATENT DOCUMENTS

| | | |
|---|---|---|
| 7,462,298 B2 | 12/2008 | Hsu et al. |
| 7,605,410 B2 | 10/2009 | Takano et al. |
| 7,618,260 B2 * | 11/2009 | Daniel .................. A44C 5/0007 24/311 |
| 8,040,456 B2 | 10/2011 | Yamazaki et al. |
| 8,218,105 B2 | 7/2012 | Yamazaki et al. |
| 8,319,725 B2 | 11/2012 | Okamoto et al. |
| 8,367,440 B2 | 2/2013 | Takayama et al. |
| 8,373,835 B2 | 2/2013 | Nobeoka et al. |
| 8,415,208 B2 | 4/2013 | Takayama et al. |
| 8,427,420 B2 | 4/2013 | Yamazaki et al. |
| 8,482,909 B2 | 7/2013 | Douglas |
| 8,634,041 B2 | 1/2014 | Yamazaki et al. |
| 8,637,794 B2 | 1/2014 | Singh et al. |
| 8,642,987 B2 | 2/2014 | Takano et al. |
| 8,785,030 B2 * | 7/2014 | Ueda .................. H01M 50/10 429/127 |
| 8,797,721 B2 | 8/2014 | Pakula et al. |
| 8,852,796 B2 | 10/2014 | Kim |
| 8,884,194 B2 | 11/2014 | Singh et al. |
| 8,884,845 B2 | 11/2014 | Yamazaki et al. |
| 8,929,085 B2 | 1/2015 | Franklin et al. |
| 9,007,309 B2 | 4/2015 | Hinata |
| 9,392,643 B2 | 7/2016 | Singh et al. |
| 9,557,386 B2 | 1/2017 | Henderson et al. |
| 9,646,861 B2 | 5/2017 | Singh et al. |
| 9,983,757 B2 | 5/2018 | Porter et al. |
| 10,236,193 B2 | 3/2019 | Singh et al. |
| 2005/0174302 A1 | 8/2005 | Ishii |
| 2005/0189906 A1 | 9/2005 | Sun |
| 2006/0146514 A1 | 7/2006 | Douglas |
| 2006/0202618 A1 | 9/2006 | Ishii et al. |
| 2008/0002527 A1 | 1/2008 | Ishii et al. |
| 2009/0071952 A1 | 3/2009 | Kuwabara |
| 2010/0239907 A1 | 9/2010 | Izumi |
| 2011/0102726 A1 | 5/2011 | Nobeoka et al. |
| 2012/0182677 A1 | 7/2012 | Seo |
| 2012/0244408 A1 | 9/2012 | Huang et al. |
| 2012/0250250 A1 | 10/2012 | Tatebe |
| 2012/0253485 A1 * | 10/2012 | Weast .................. A63B 24/0059 700/91 |
| 2013/0044215 A1 * | 2/2013 | Rothkopf .................. G06F 1/163 348/143 |
| 2013/0083496 A1 | 4/2013 | Franklin et al. |
| 2013/0100392 A1 | 4/2013 | Fukushima |
| 2013/0224562 A1 | 8/2013 | Momo |
| 2013/0252065 A1 | 9/2013 | Ueda |
| 2014/0009048 A1 | 1/2014 | Yanagisawa |
| 2014/0055394 A1 | 2/2014 | Park et al. |
| 2014/0242450 A1 | 8/2014 | Oono et al. |
| 2014/0307398 A1 | 10/2014 | Eguchi et al. |
| 2015/0022957 A1 | 1/2015 | Hiroki et al. |
| 2015/0078588 A1 | 3/2015 | Umehara et al. |
| 2015/0116125 A1 * | 4/2015 | Armstrong .......... A61B 5/6824 340/870.01 |
| 2015/0116920 A1 | 4/2015 | Franklin et al. |
| 2015/0220109 A1 | 8/2015 | Von Badinski et al. |
| 2015/0242012 A1 | 8/2015 | Petcavich et al. |
| 2015/0261254 A1 | 9/2015 | Hiroki et al. |
| 2016/0077548 A1 | 3/2016 | Lim et al. |
| 2016/0300741 A1 | 10/2016 | Singh et al. |
| 2016/0315286 A1 | 10/2016 | Kuroki et al. |
| 2016/0342176 A1 | 11/2016 | Han et al. |
| 2016/0357222 A1 | 12/2016 | Seo et al. |
| 2017/0100634 A1 | 4/2017 | Henderson et al. |
| 2017/0235933 A1 | 8/2017 | Von Badinski et al. |

FOREIGN PATENT DOCUMENTS

| | | |
|---|---|---|
| CN | 001828778 A | 9/2006 |
| CN | 101026163 A | 8/2007 |
| CN | 101097437 A | 1/2008 |
| CN | 100380253 C | 4/2008 |
| CN | 102668058 A | 9/2012 |
| CN | 202975616 U | 6/2013 |
| CN | 103533788 A | 1/2014 |
| CN | 103827771 A | 5/2014 |
| EP | 1826818 A | 8/2007 |
| EP | 1873595 A | 1/2008 |
| EP | 2294937 A | 3/2011 |
| EP | 2779268 A | 9/2014 |
| EP | 2811721 A | 12/2014 |
| JP | 2000-259577 A | 9/2000 |
| JP | 2000-285904 A | 10/2000 |
| JP | 2001-052762 A | 2/2001 |
| JP | 2002-090479 A | 3/2002 |
| JP | 2002-170538 A | 6/2002 |
| JP | 2005-157317 A | 6/2005 |
| JP | 2005-250442 A | 9/2005 |
| JP | 2007-051965 A | 3/2007 |
| JP | 2007-078670 A | 3/2007 |
| JP | 2008-008832 A | 1/2008 |
| JP | 2008-145173 A | 6/2008 |
| JP | 2008-233779 A | 10/2008 |
| JP | 2008-257494 A | 10/2008 |
| JP | 2011-060576 A | 3/2011 |
| JP | 2011-095452 A | 5/2011 |
| JP | 2012-142001 A | 7/2012 |
| JP | 2013-101764 A | 5/2013 |
| JP | 2013-167868 A | 8/2013 |
| JP | 2013-239857 A | 11/2013 |
| JP | 2015-501461 | 1/2015 |
| KR | 2014-0069302 A | 6/2014 |
| WO | WO-2004/068990 | 8/2004 |
| WO | WO-2011/049620 | 4/2011 |
| WO | WO-2012/002272 | 1/2012 |
| WO | 2013/048925 | 4/2013 |
| WO | WO-2013/048925 | 4/2013 |
| WO | 2013/069704 | 5/2013 |
| WO | WO-2013/069704 | 5/2013 |
| WO | WO-2013/109687 | 7/2013 |
| WO | WO-2013/109940 | 7/2013 |
| WO | WO-2013/172018 | 11/2013 |

OTHER PUBLICATIONS

Written Opinion (Application No. PCT/IB2015/051385) dated Jun. 9, 2015.

Taiwanese Office Action (Application No. 104106499) dated Jul. 4, 2018.

Taiwanese Office Action (Application No. 108148706) dated Mar. 26, 2020.

Chinese Office Action (Application No. 201911313484.4) dated Jun. 8, 2020.

* cited by examiner

FIG. 10A
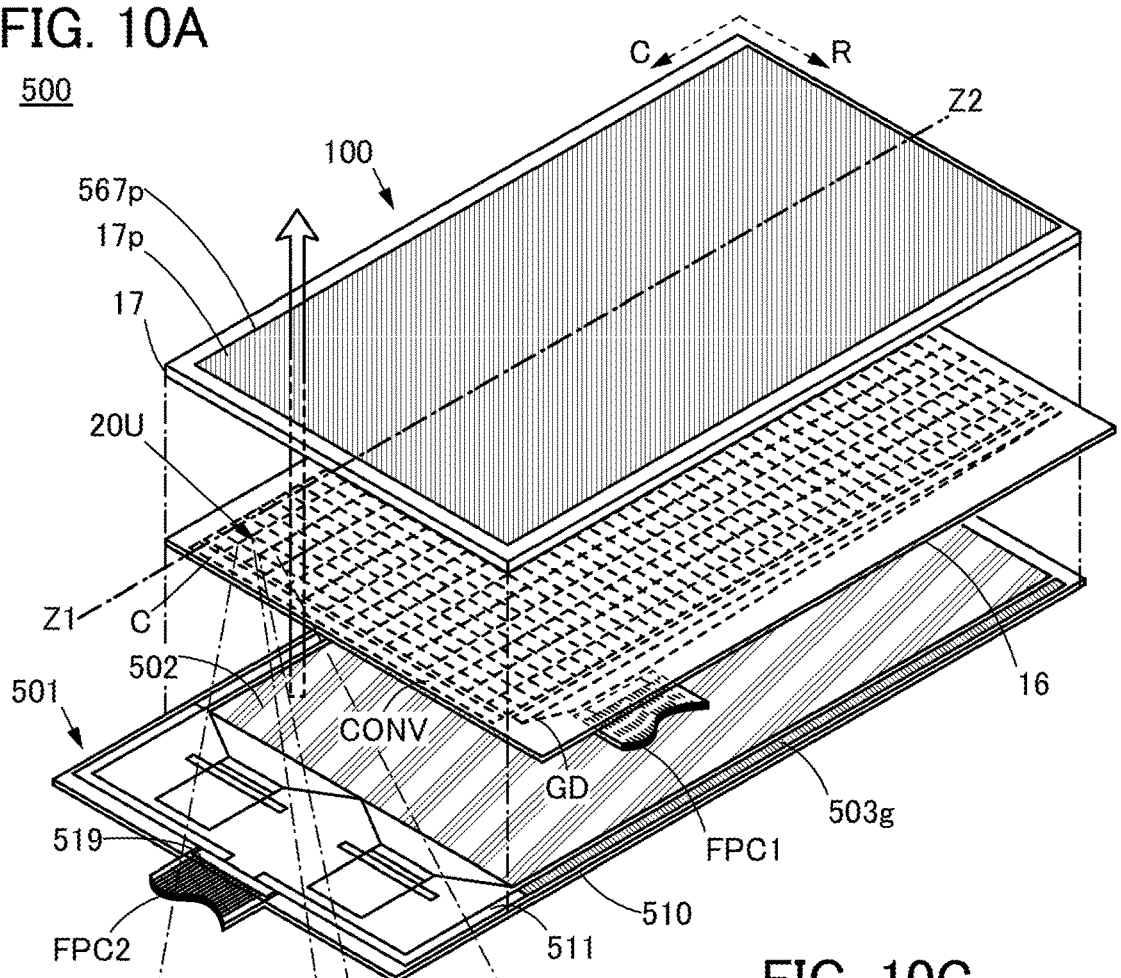
FIG. 10C
FIG. 10B
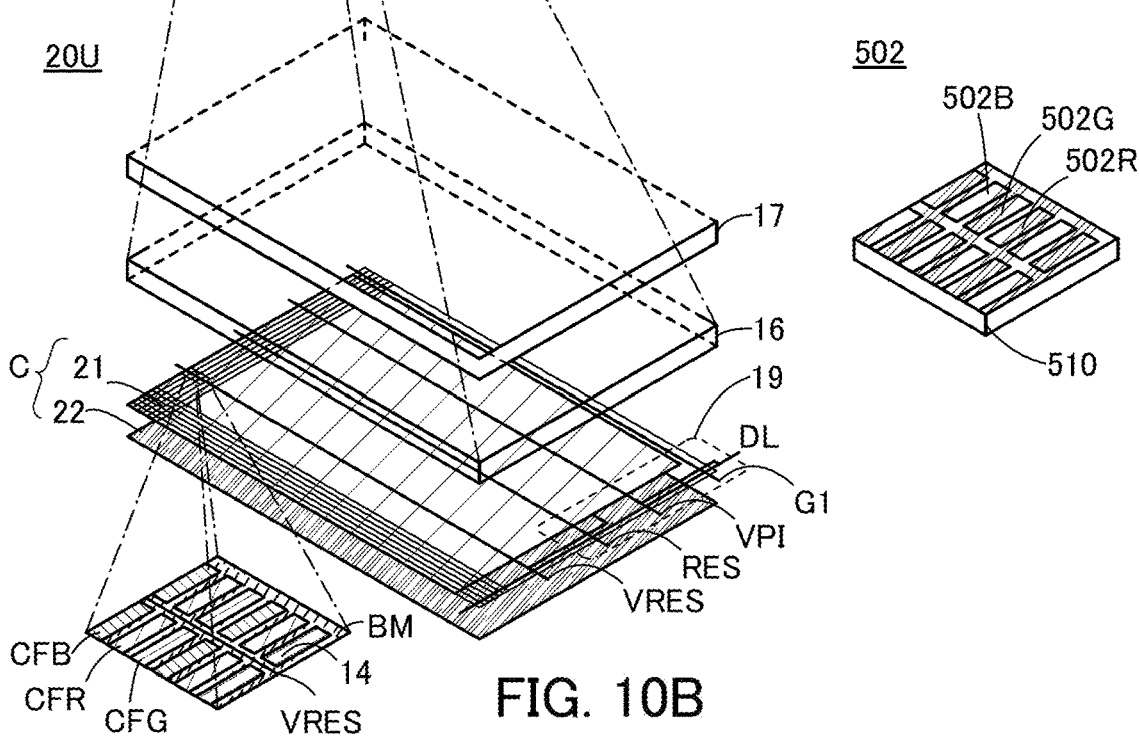

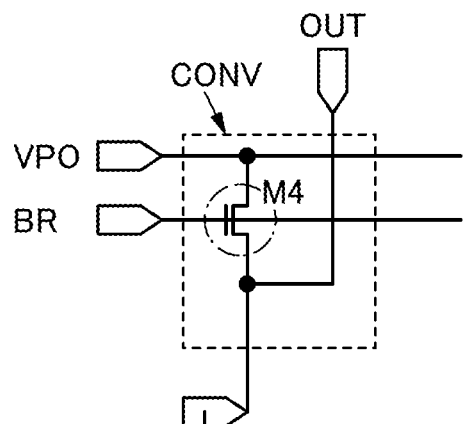
FIG. 12A
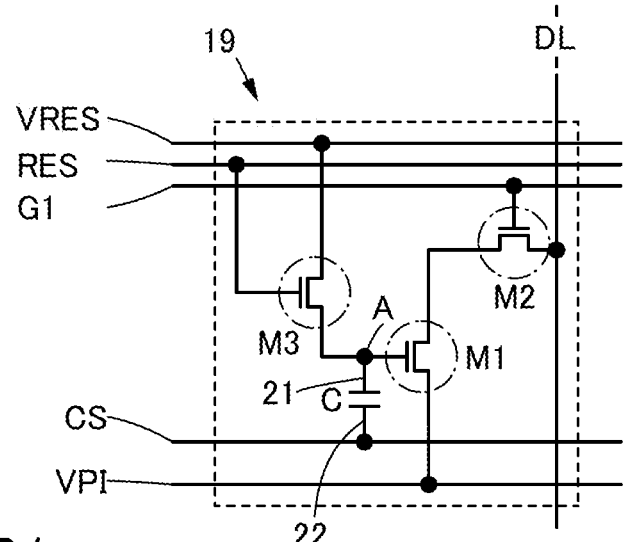
FIG. 12B1
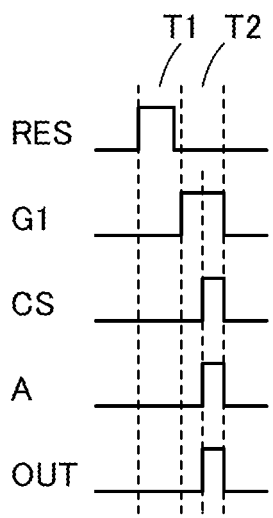
FIG. 12B2
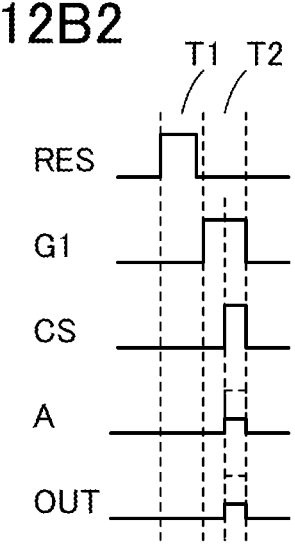

ELECTRONIC DEVICE

CROSS-REFERENCE TO RELATED APPLICATIONS

This application is a continuation of U.S. application Ser. No. 16/407,448, filed May 9, 2019, now allowed, which is a continuation of U.S. application Ser. No. 15/453,946, filed Mar. 9, 2017, now U.S. Pat. No. 10,289,158, which is a continuation of U.S. application Ser. No. 14/641,637, filed Mar. 9, 2015, now U.S. Pat. No. 9,594,402, which claims the benefit of a foreign priority application filed in Japan as Serial No. 2014-050855 on Mar. 13, 2014, all of which are incorporated by reference.

TECHNICAL FIELD

The present invention relates to an object, a method, or a manufacturing method. The present invention relates to a process, a machine, manufacture, or a composition of matter. One embodiment of the present invention relates to a semiconductor device, a display device, a light-emitting device, a power storage device, a driving method thereof, or a manufacturing method thereof. In particular, one embodiment of the present invention relates to an electronic device.

Note that electronic devices in this specification mean all devices including secondary batteries, and electro-optical devices including secondary batteries, information terminal devices including secondary batteries, vehicles including secondary batteries, and the like are all electronic devices.

BACKGROUND ART

In recent years, portable information terminals typified by smartphones have been actively developed. Users desire portable information terminals, which are a kind of electronic device, to be lightweight and compact.

Patent Document 1 discloses an example of a hands-free wearable device with which information can be visually obtained at any place, specifically, a goggle-type display device that includes a CPU and is capable of data communication. The device disclosed in Patent Document 1 is also a kind of electronic device.

Most wearable devices and portable information terminals include secondary batteries that can be repeatedly charged and discharged and have problems in that, because of their lightness and compactness, the time for operation is limited. Secondary batteries used in wearable devices and portable information terminals should be lightweight and compact and should be able to be used for a long time.

Examples of the secondary battery include a nickel-metal hydride battery and a lithium-ion secondary battery. In particular, lithium-ion secondary batteries have been actively researched and developed because capacity thereof can be increased and size thereof can be reduced.

Electrodes serving as positive electrodes or negative electrodes of lithium-ion secondary batteries are each formed using, for example, lithium metal or a carbon-based material.

[Reference]
[Patent Document]
[Patent Document 1] Japanese Published Patent Application No. 2005-157317

DISCLOSURE OF INVENTION

An object is to provide an electronic device having a novel structure, specifically, an electronic device having a novel structure that can have various forms. Another object is to provide an electronic device having a novel structure that can have various forms and a secondary battery that fits the forms of the electronic device.

Note that the descriptions of these objects do not disturb the existence of other objects. In one embodiment of the present invention, there is no need to achieve all the objects. Other objects will be apparent and can be derived from the descriptions of the specification, the drawings, the claims, and the like.

In the case where an electronic device is formed to have a complicated form, a housing is designed to have a complicated form and electronic components (e.g., a power source, a wiring, a transistor, a resistor, and a capacitor) are arranged in an internal space of the housing. When the electronic device is large and it does not matter how heavy the electronic device is, the volume of the internal space of the housing is relatively large; thus, the electronic components can be arranged relatively freely.

In the case where an electronic device having a complicated form is required to be compact and lightweight, the volume of an internal space of a housing is small, and electronic components and the sizes thereof are selected according to the volume and the electronic components are then arranged. In this case, the manufacturing cost is increased because smaller electronic components are more expensive.

Moreover, as for a secondary battery, as the volume or weight of a secondary battery increases, the capacity thereof tends to increase. Therefore, there are limitations on the size and arrangement of a secondary battery that is incorporated in a small electronic device.

In the case where external force is applied and part of an electronic device is changed in form, stress is applied to a housing, a display portion, a secondary battery, and the like, and part thereof is changed in form. An electronic device that is suitable for a wearable device can be flexibly changed in form and is less likely to be broken when external force is intentionally or unintentionally applied thereto.

In a display portion, preferably, film substrates are used as a pair of substrates and a display element is provided between the pair of substrates. In this way, a flexible display module can be achieved.

In the case where a touchscreen is provided, a flexible touchscreen in which a substrate provided with a touch input sensor is a film substrate is preferably used.

In the case where the number of film substrates that overlap with each other in an electronic device is increased, misalignment of the film substrates is caused, for example, when they are bent. Accordingly, the number of film substrates is preferably small, and it is preferable to provide a display element and a touch sensor element between a pair of film substrates.

It is also preferable that a buffer layer which absorbs a difference in the amount of change in form be provided between adjacent film substrates which overlap with each other. As the buffer layer, a gelled resin material, a rubber resin material, a liquid material, an air layer, or the like can be used. Furthermore, an optical film such as a polarizing film or a color filter may be used as the buffer layer. A plurality of buffer layers may be provided in an electronic device.

One embodiment of a structure of the invention disclosed in this specification is an electronic device including: a first buffer layer over a holding structure body having a curved portion, a protective film having a curved portion over the first buffer layer, a display portion having a curved portion over the protective film having the curved portion, a second buffer layer over the display portion having the curved portion, and a touch input portion having a curved portion over the second buffer layer.

One embodiment of another structure is an electronic device including: a first buffer layer over a holding structure body having a curved portion, a protective film having a curved portion over the first buffer layer, a display portion having a curved portion over the protective film having the curved portion, a touch input portion having a curved portion over the display portion having the curved portion, and a second buffer layer over the touch input portion having the curved portion.

In each of the above structures, the curved portion of the display portion overlaps with the curved portion of the protective film. A material which is more rigid than that of the display portion (display panel) is used for the protective film, so that a film substrate of the display portion is curved along the form of the surface of the protective film.

In each of the above structures, the second buffer layer which is formed over the display portion is preferably formed using a light-transmitting material.

In addition, as a power source of the electronic device, a flexible secondary battery is preferably used.

For example, in the case where a secondary battery is changed in form by applying external force, the external force is applied to an object such as a film used as an exterior body of the secondary battery and the object is stressed. This might partly deform or damage the object.

A secondary battery that can relieve a strain caused by stress is provided. A "strain" is the scale of change in form indicating the displacement of a point of an object relative to the reference (initial) length of the object. A secondary battery that can reduce the influence of a strain, that is, the scale of change in form caused by application of external force to the secondary battery, to an acceptable level is provided.

One embodiment of a structure of the invention disclosed in this specification is an electronic device including: a secondary battery having a curved portion over a holding structure body having a curved portion, a buffer layer over the secondary battery having the curved portion, a protective film having a curved portion over the buffer layer, a display portion having a curved portion over the protective film having the curved portion, and a touch input portion having a curved portion over the display portion having the curved portion.

In the above structure, the display portion includes a pair of films and a light-emitting element between the pair of films. When the touch input portion is provided between the pair of films, the number of components can be reduced and the electronic device can be thin.

In the above structure, the radius of curvature of the curved portion of the holding structure body is smaller than that of the curved portion of the display portion. The holding structure body is in contact with a forearm; thus, the radius of curvature of the curved portion of the holding structure body is smaller than that of the curved portion of the display portion provided on the outer side. When the radius of curvature of the curved portion of the display portion is large, the visibility of a displayed image can be increased, which is preferable.

In the above structure, an exterior body of the secondary battery is a film having unevenness formed by pressing, so that the secondary battery is flexible.

In the above structure, the holding structure body has a film shape; however, there is no particular limitation on the shape of the holding structure body. The holding structure body can have a monocoque structure with a hollow space or a semimonocoque structure which partly has an opening. One embodiment of a structure in such a case is an electronic device including: a secondary battery having a curved portion in a region surrounded by a holding structure body having a projection and a depression, a buffer layer overlapping with the secondary battery, a protective film having a curved portion overlapping with the buffer layer, a display portion having a curved portion overlapping with the protective film, and a touch input portion overlapping with the display portion.

Part of a device like a watch is brought in contact with part of the body (wrist or arm) of a user, that is, the user wears the device, whereby the user can feel like the device is lighter than the actual weight. The use of a flexible secondary battery in an electronic device having a form with a curved surface that fits part of the body of a user allows the secondary battery to be fixed so as to have a form suitable for the electronic device.

When a user moves part of the body on which an electronic device is worn, the user might feel uncomfortable, regard the electronic device as a distraction, and feel stress even in the case where the electronic device has a curved surface that fits part of the body. In the case where at least part of an electronic device can be changed in form according to movement of the body of a user, the user does not feel uncomfortable, and a flexible secondary battery can be provided in a portion of the electronic device that can be changed in form.

An electronic device does not necessarily have a form with a curved surface or a complicated form; an electronic device may have a simple form. For example, the number or size of components that can be incorporated in an electronic device with a simple form is determined depending on the volume of a space formed by a housing of the electronic device in many cases. Providing a flexible secondary battery in a space between components other than the secondary battery enables a space formed by the housing of the electronic device to be efficiently used; thus, the electronic device can be reduced in size.

Examples of a wearable device include wearable input terminals such as a wearable camera, a wearable microphone, and a wearable sensor, wearable output terminals such as a wearable display and a wearable speaker, and wearable input/output terminals having the functions of any of the input terminals and any of the output terminals. Another example of a wearable device is a device that controls each device and calculates or processes data, typically, a wearable computer including a CPU. Other examples of a wearable device include devices that store data, send data, and receive data, typically, a portable information terminal and a memory.

It is possible to provide an electronic device having a novel structure, which can be at least partly bent. For example, it is possible to provide an electronic device whose display portion with a flat display screen can be bent.

It is possible to provide an electronic device having a novel structure, which has a portion that is at least partly bent. For example, it is possible to provide an electronic device which has a display portion with a bent display screen. It is possible to provide a novel electronic device. Note that the descriptions of these effects do not disturb the existence of other effects. One embodiment of the present invention does not necessarily achieve all the above effects.

Other effects will be apparent and can be derived from the descriptions of the specification, the drawings, the claims, and the like.

BRIEF DESCRIPTION OF DRAWINGS

FIGS. 10A to 10C are projection views illustrating a structure of an input/output device according to one embodiment of the present invention.

FIG. 12A is a diagram showing a configuration of a sensing circuit 19 and a converter CONV according to one embodiment of the present invention and FIGS. 12B1 and 12B2 are timing charts showing a driving method thereof.

BEST MODE FOR CARRYING OUT THE INVENTION

Embodiments of the present invention will be described in detail below with reference to the drawings. However, the present invention is not limited to the description below, and it is easily understood by those skilled in the art that modes and details disclosed herein can be modified in various ways. Furthermore, the present invention is not construed as being limited to the description of the embodiments below.
(Embodiment 1)

In this embodiment, an example of an electronic device that can be worn on a forearm of a user will be described.

Figure 1:
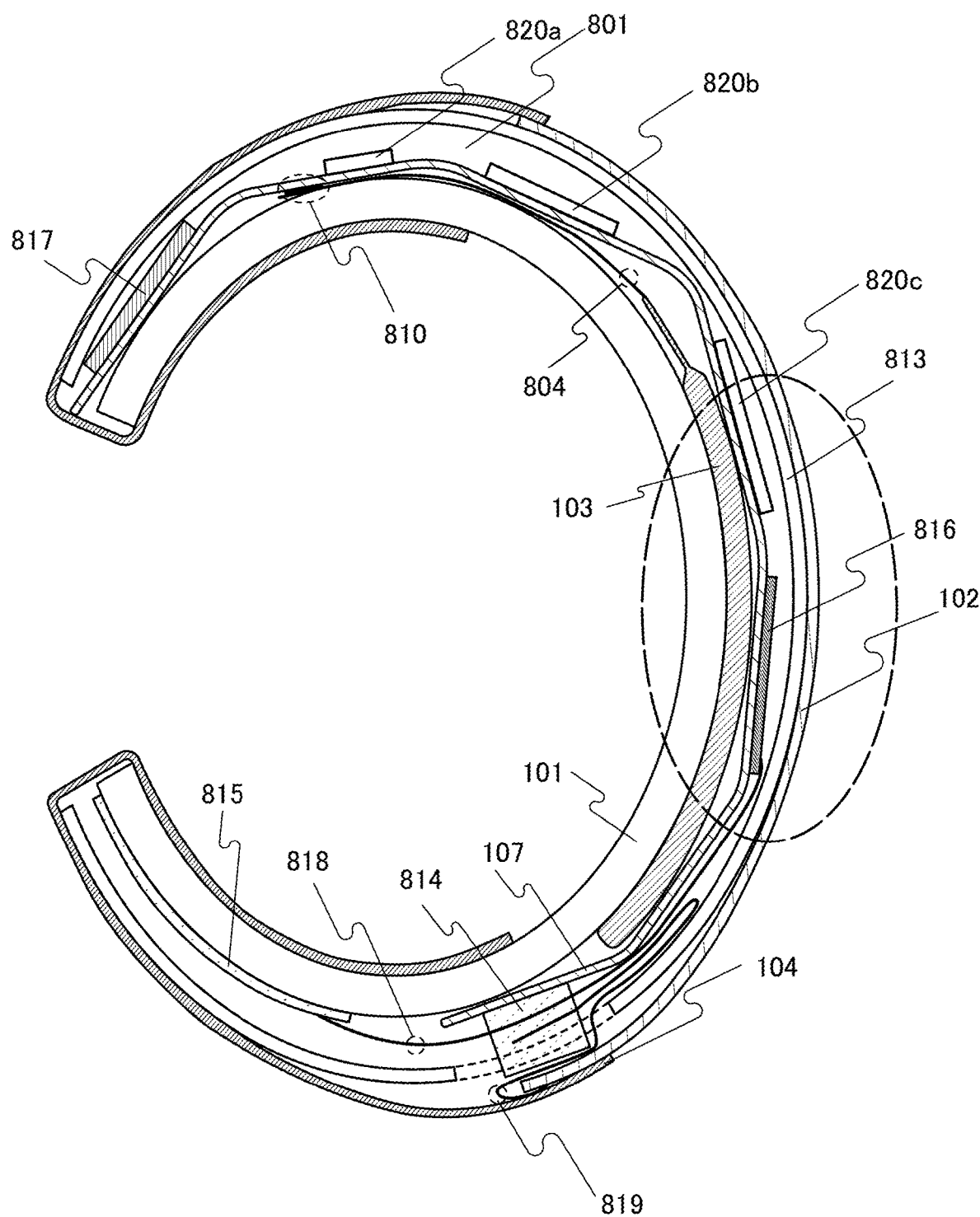
FIG. 1 is a cross-sectional view illustrating one embodiment of the present invention.
Figure 2:
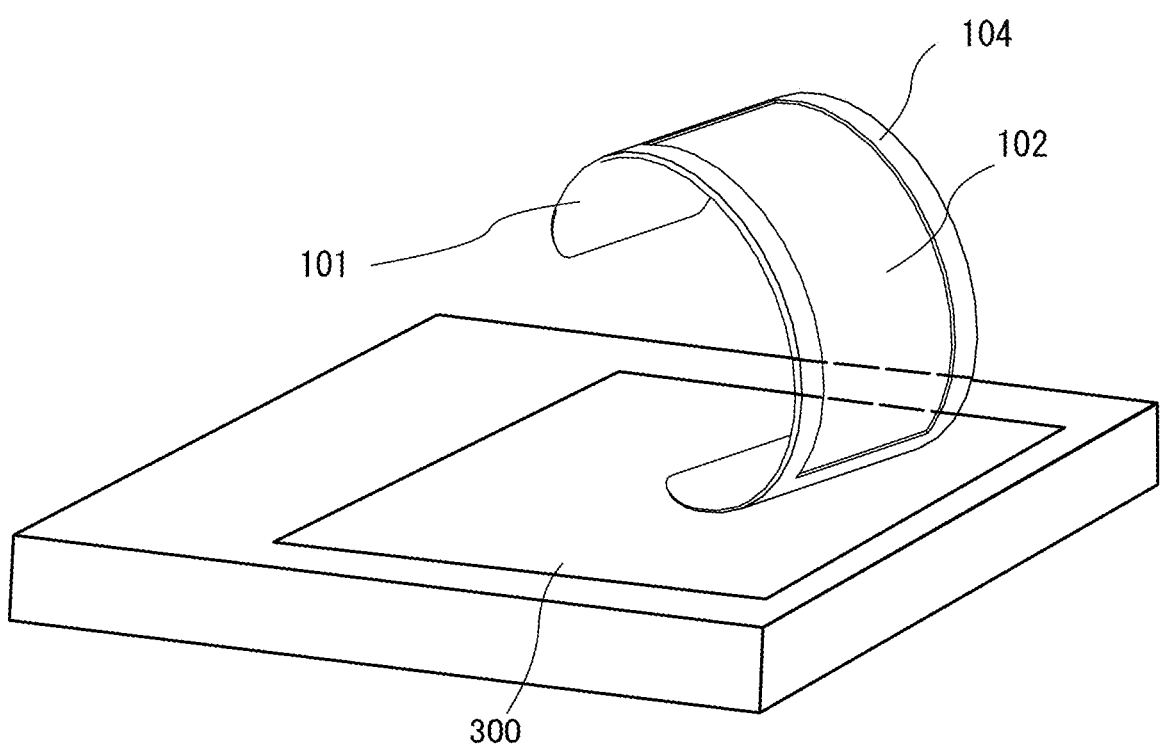
FIG. 2 is a perspective view illustrating one embodiment of the present invention.

FIG. 1 is a cross-sectional schematic view of the electronic device, and FIG. 2 is a perspective view of a charger 300 and the electronic device.

The electronic device illustrated in FIG. 1 and FIG. 2 is a display device that can be worn on an arm and display an image or data. Since a flexible lithium-ion secondary battery is used, a shape that fits an arm can be achieved, and an appearance with an attractive design and the use as an accessory are enabled.

The electronic device illustrated in FIG. 1 and FIG. 2 includes a holding structure body 101, a secondary battery 103, a control board 107, a display portion 102, a protective film 813, and a cover 104. Specifically, the secondary battery 103 is provided in contact with the holding structure body 101, the control board 107 is provided over the secondary battery 103, the protective film 813 is provided over the control board 107, and the display portion 102 and the cover 104 are provided over the protective film 813. In addition, the electronic device is provided with an antenna 815 for wireless charging; when the electronic device is brought close to or put on the charger 300 as illustrated in FIG. 2, the wireless charging can be performed according to the Qi standard. The electronic device also includes a communication device 817 for wirelessly communicating data to be used to perform display with an external device.

An exterior body of the secondary battery 103 is a flexible thin film and is embossed; thus, it can be bonded to the holding structure body 101 having a curved surface and can change its form along the curved surface of a region of the holding structure body 101, which has a large radius of curvature.

In addition, the holding structure body 101 is flexible. With the holding structure body 101, components of the electronic device are wrapped or a surface in contact with outside air is made. For example, in order to hold a flexible display panel, the flexible display panel may be disposed over the holding structure body 101 that is more rigid than the flexible display panel; in such a case, the holding structure body 101 can also be referred to as a support structure body.

The holding structure body 101 is not limited to a film shape and can have a monocoque structure with a hollow space or a semimonocoque structure which includes a projection or a depression and partly has an opening. When the holding structure body 101 has a monocoque structure or a semimonocoque structure, an element is provided inside the holding structure body 101 or in an internal region made by the holding structure body 101. The holding structure body 101 has a region that can be easily curved. Note that the holding structure body 101 can also be formed using a material other than plastics (rubber, Styrofoam, sponge, a silicone resin, stainless steel, aluminum, paper, carbon fiber, a sheet including an artificial spider's thread fiber containing protein called fibroin, a complex in which any of these materials and a resin are mixed, a stack of a resin film and a nonwoven fabric of a cellulose fiber whose fiber width is greater than or equal to 4 nm and less than or equal to 100 nm, a stack of a resin film and a sheet including an artificial spider's thread fiber, or the like). In addition, in order to hold a flexible display panel, a holding structure body which is less rigid than the flexible display panel but has a structure to surround the display panel may be used, or a first holding structure body holding one surface of the display panel and a second holding structure body holding another surface of the display panel may be used.

The holding structure body 101 is, for example, in the form of a bracelet obtained by curving a band-like structure body. In addition, the holding structure body 101 is at least partly flexible, and a user can wear the electronic device on a wrist by changing the form of the holding structure body 101. When the form of the electronic device is changed, misalignment between the holding structure body 101 and the display portion 102 or between the holding structure body 101 and the protective film 813 might occur. Even if misalignment occurs because of the change in form, the display portion 102 and the holding structure body 101 are not fixed to each other, the protective film 813 keeps a space to prevent the control board 107 and the display portion 102 from being in contact with each other, and a buffer layer 801 is provided between the control board 107 and the protective film 813.

The protective film 813 protects a component inside the electronic device, in particular, the control board 107 from a sudden shock from the outside. The protective film 813 has an opening for passing an FPC 819 therethrough, and also serves as a support body of the display portion to maintain the curvature of a display screen because the display portion is thin. The protective film 813 is changed in form as part of the electronic device and thus can be formed using a material similar to that of the holding structure body 101 (a resin film of polyimide (PI), an aramid resin, polyethylene terephthalate (PET), polyethersulfone (PES), polyethylene naphthalate (PEN), polycarbonate (PC), nylon, polyetheretherketone (PEEK), polysulfone (PSF), polyetherimide (PEI), polyarylate (PAR), polybutylene terephthalate (PBT), or a silicone resin, a metal film, paper, prepreg, a film containing a carbon fiber, or the like). Note that the protective film 813 may be formed using a material different from that of the holding structure body 101.

The cover 104 is a light-blocking film having one surface coated with an adhesive and wraps part of the electronic device to bring components together and has an opening overlapping with the display portion 102. The cover 104 can conceal the internal structure owing to its light-blocking property, improving the design of the electronic device. Note that the electronic device may be intentionally formed so that its internal structure can be seen from the outside. In that case, the cover 104 does not have to have a light-blocking property. Also in the case where the protective film 813 has a light-blocking property, the cover 104 does not have to have a light-blocking property. Alternatively, a cover may be provided on the side surface of the electronic device so that the internal structure of the electronic device cannot be seen from the side surface.

The control board 107 has slits to curve it, and is provided with the communication device 817 conforming to Bluetooth (registered trademark) standards, a microcomputer, a storage device, an FPGA, a DA converter, a charge control IC, a level shifter, and the like. ICs 820a, 820b, and 820c (e.g., a microcomputer, a storage device, an FPGA, a DA converter, a charge control IC, and a level shifter) and the like are mounted on flat surfaces each of which is between the slits of the control board 107 as illustrated in FIG. 1. The control board 107 is connected to a display module including the display portion 102 through an input/output connector 814. In addition, the control board 107 is connected to the antenna 815 through a wiring 818 and connected to the secondary battery 103 through a lead electrode 804 and a connection portion 810. A power supply control circuit 816 controls charge and discharge of the secondary battery 103.

The display module refers to a display panel provided with at least components up to the FPC 819. The electronic device in FIG. 1 includes the display portion 102, the FPC 819, and a driver circuit and further includes a converter for power feeding from the secondary battery 103.

In the display module, the display portion 102 is flexible and a display element is provided over a flexible film.

Examples of a method for manufacturing the display element over the flexible film include a method in which the display element is directly formed over the flexible film, a method in which a layer including the display element is formed over a rigid substrate such as a glass substrate, the substrate is removed by etching, polishing, or the like, and then the layer including the display element and the flexible film are attached to each other, a method in which a separation layer is provided over a rigid substrate such as a glass substrate, a layer including the display element is formed thereover, the rigid substrate and the layer including the display element are separated from each other using the separation layer, and then the layer including the display element and the flexible film are attached to each other, and the like.

As the flexible film, in addition to a plastic film using an organic material (polyimide (PI), an aramid resin, polyethylene terephthalate (PET), polyethersulfone (PES), polyethylene naphthalate (PEN), polycarbonate (PC), nylon, polyetheretherketone (PEEK), polysulfone (PSF), polyetherimide (PEI), polyarylate (PAR), polybutylene terephthalate (PBT), a silicone resin, or the like), an inorganic material such as a metal plate or a thin glass plate having a thickness of greater than or equal to 10 µm and less than or equal to 50 µm can be used. As the flexible film, for example, a composite material such as a resin or a resin film into which a fibrous or particulate metal, glass, or inorganic material is dispersed can be used.

The secondary battery 103 and the display portion 102 are preferably disposed so as to partly overlap with each other. When the secondary battery 103 and the display portion 102 are disposed so as to partly or entirely overlap with each other, the electrical path, i.e., the length of a wiring, from the secondary battery 103 to the display portion 102 can be shortened, whereby power consumption can be reduced. In addition, providing the display module between the protective film 813 and the cover 104 enables protection of the display module from unexpected deformation (e.g., wrinkles or a twist), increasing the lifetime of the electronic device as a product. The cover 104 includes an adhesive layer and is adhered to the protective film 813, the display portion 102, and the holding structure body 101.

In addition, the display portion 102 may be provided with a touch input sensor so that input of data to the electronic device and operation of the electronic device can be performed with the touch input sensor.

Figure 3A:
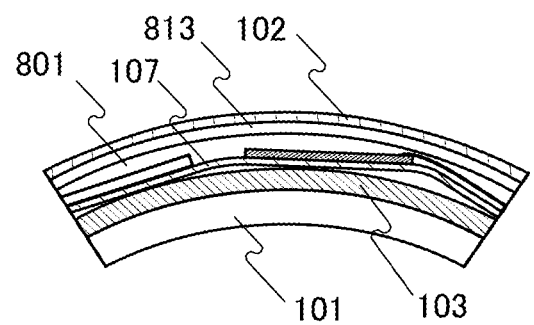
FIGS. 3A and 3B are cross-sectional views each illustrating one embodiment of the present invention.

FIG. 3A illustrates part of the cross-sectional structure corresponding to a portion surrounded by a dashed line in FIG. 1. In a region overlapping with the display portion 102, the holding structure body 101 and the secondary battery 103 are in contact with each other but not adhered and fixed to each other. The exterior body of the secondary battery 103 is embossed, so that the holding structure body 101 and the secondary battery 103 which are in contact with each other slide on each other easily. The protective film 813 and the control board 107 are also partly in contact with each other but not adhered and fixed to each other. The stacked films are not adhered and fixed to each other, so that they can slide to relieve the stress when the electronic device is bent.

In the display portion 102, a display element and a touch input sensor are provided between a pair of films.

In this embodiment, organic EL elements are provided for an active matrix method over one film and capacitive touch sensors are provided over the other film. Then, the two films are attached to each other, so that the organic EL elements and the touch sensors are provided between the two films. Note that the touch sensors are not limited to the capacitive touch sensors, and a variety of sensors (e.g., an optical sensor using a photoelectric conversion element and a pressure-sensitive sensor using a pressure-sensitive element) that can sense the approach or the contact of a sensing target such as a finger, and the like can be used. Input operation of the touch input portion in this specification is not necessarily performed by touching the display portion with a finger or the like. The touch input portion in this specification includes, in its category, a device for which input operation can be performed without contact and by bringing a finger close to the display portion.

Figure 3B:
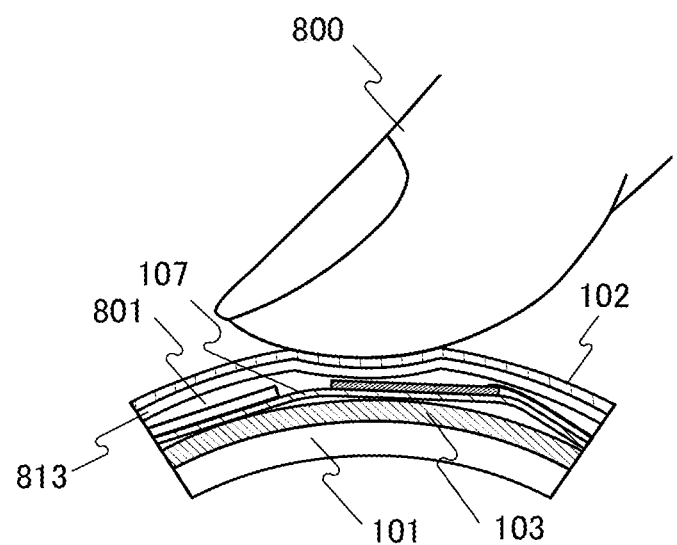

FIG. 3B is a cross-sectional schematic view of the display portion 102 that is touched with a finger. When the display portion 102 is touched with a finger 800, the touched region is pressed and changed in form. FIG. 3B illustrates the display portion 102 and the protective film 813 which are changed in form. A material which is more rigid than that of the display portion 102 is used for the protective film 813, so that the amount of change in form is suppressed. When a layer (e.g., an aramid resin layer) that can disperse pressure or the like is used for the protective film 813, the protective film 813 itself has a function of a buffer layer. Furthermore, the buffer layer 801 is provided between the control board 107 and the protective film 813; thus, the control board 107 keeps its shape without being changed in form.

In this embodiment, the buffer layer 801 is air, and the electronic device has a structure in which air is released to the outside when the display portion is pressed with a finger or the like. The buffer layer 801 is not limited to air, and a gelled resin material, a rubber resin material, a liquid material, or the like can be used. For example, as the gelled resin material, silicone gel or silicone gel containing low molecular siloxane is used.

The electronic device described in this embodiment is a flexible electronic device having a novel structure, in which the display portion 102 can be bent when pressed with a finger or the like. The display portion 102, the secondary battery 103, the control board 107, the protective film 813, and the like are flexible; therefore, even when the holding structure body 101 is changed in form when the electronic device is worn on a forearm, the electronic device can endure the change in form and is thus highly reliable.

(Embodiment 2)

In this embodiment, an example of an electronic device whose internal structure is partly different from that of the electronic device described in Embodiment 1 will be described with reference to FIGS. 4A to 4C and FIGS. 5A and 5B.

Figure 4A:
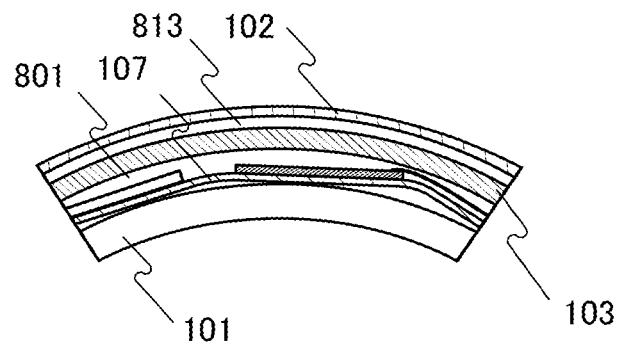
FIGS. 4A to 4C are cross-sectional views each illustrating one embodiment of the present invention.

In the structure illustrated in FIG. 4A, the position of the secondary battery is different from that in Embodiment 1.

The control board 107 is provided over the holding structure body 101, and the secondary battery 103 is fixed to the control board 107 with the buffer layer 801 therebetween. In FIG. 4A, the protective film 813 and the secondary battery 103 may be fixed to each other with an adhesive layer or the like.

Figure 4B:
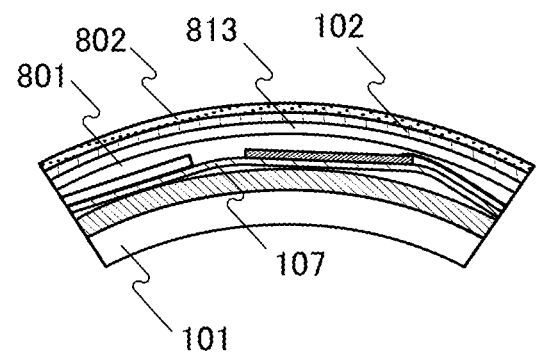

In the structure illustrated in FIG. 4B, unlike in Embodiment 1, a second buffer layer 802 is further provided over the display portion 102. As the second buffer layer 802, an optical film such as polarizing film, a film for preventing a scratch or the like on a surface of the display portion 102, or the like is used. A touchscreen may be used as the second buffer layer 802. In the case where a touchscreen is used as the second buffer layer 802, the display portion 102 does not have to include a touch sensor. Note that the second buffer layer 802 may include an adhesive layer to be adhered to the display portion 102. The adhesive layer overlaps with the display portion 102 and is thus preferably formed using a light-transmitting material.

Figure 4C:
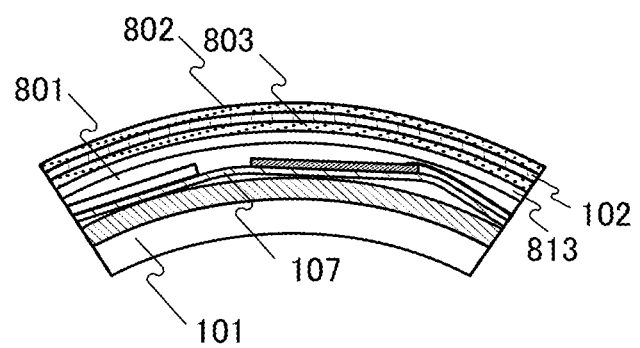

In the structure illustrated in FIG. 4C, unlike in Embodiment 1, buffer layers are further provided over and below the display portion 102. As the second buffer layer 802 provided over the display portion 102, the same film or touchscreen as in FIG. 4B can be used.

As a third buffer layer 803 provided between the display portion 102 and the protective film 813, a gelled resin material, a rubber resin material, a liquid material, or the like can be used. For example, as the gelled resin material, silicone gel or silicone gel containing low molecular siloxane is used. Since the third buffer layer 803 is provided, the display portion 102 and the protective film 813 can slide to relieve stress when external force is applied.

Figure 5A:
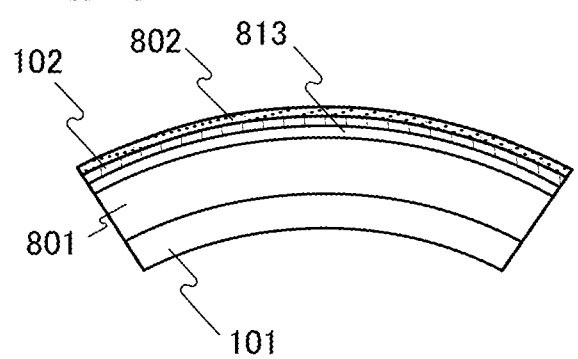
FIGS. 5A and 5B are cross-sectional views each illustrating one embodiment of the present invention.

In the structure illustrated in FIG. 5A, unlike in Embodiment 1, the secondary battery and the control circuit are provided so as not to overlap with the display portion, and the buffer layer 801 is provided between the holding structure body 101 and the protective film 813. As the second buffer layer 802 provided over the display portion 102, the same film or touchscreen as in FIG. 4B can be used.

In the structure illustrated in FIG. 5A, since the secondary battery and the control circuit are not provided so as to overlap with the display portion, the buffer layer 801 is provided, with which stress can be relieved even when a depression is formed by pressing the display portion. Therefore, a flexible electronic device having a robust display portion can be achieved.

Figure 5B:
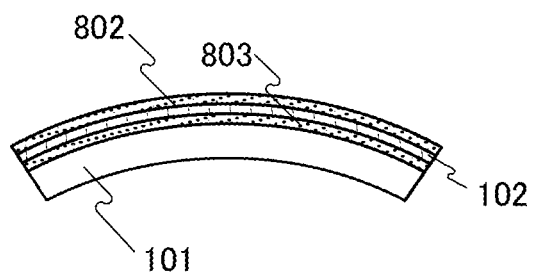

In the structure illustrated in FIG. 5B, priority is given to the thinness of the display portion. The second buffer layer 802 is provided over the display portion 102, and the third buffer layer 803 is provided between the display portion 102 and the holding structure body 101. Although not illustrated in FIG. 5B, in this electronic device, a buffer layer made of air is provided in a region which does not overlap with the display portion 102.

This embodiment can be freely combined with Embodiment 1.

(Embodiment 3)

In this embodiment, an example of fabricating a lithium-ion secondary battery with the use of a film whose surface is embossed and provided with a pattern will be described.

Figure 6A:
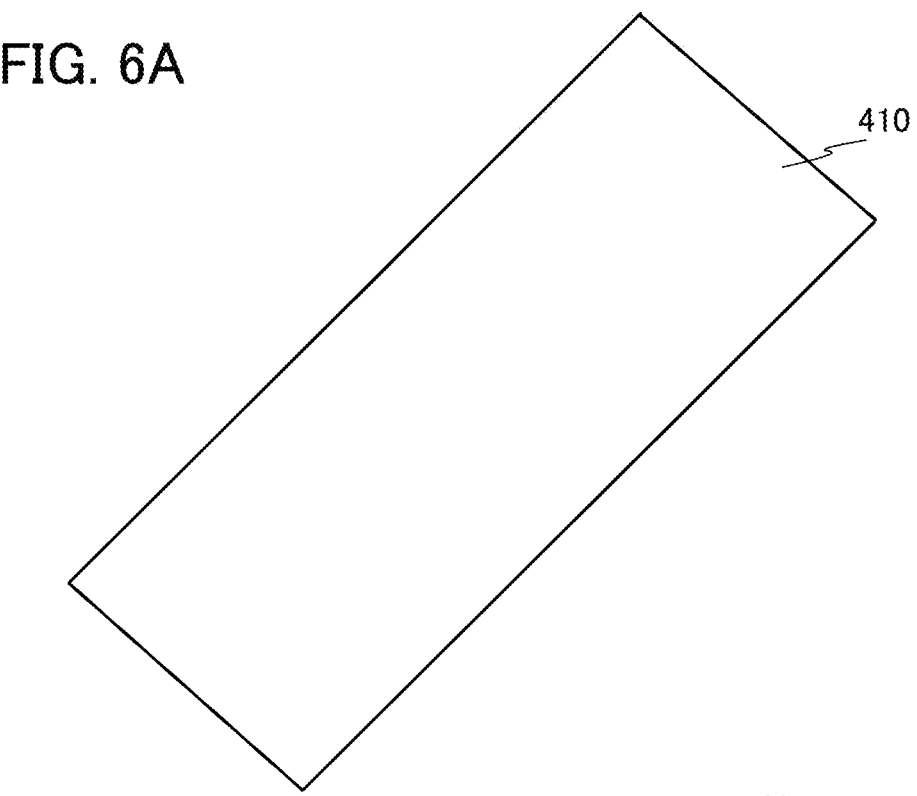
FIGS. 6A and 6B are top views each illustrating one embodiment of the present invention.

First, a sheet made of a flexible base is prepared. As the sheet, a stack, a metal film provided with an adhesive layer (also referred to as a heat-seal layer) or sandwiched between adhesive layers, is used. As the adhesive layer, a heat-seal resin film containing, e.g., polypropylene or polyethylene is used. In this embodiment, a metal sheet, specifically, aluminum foil whose top surface is provided with a nylon resin and whose bottom surface is provided with a stack including an acid-proof polypropylene film and a polypropylene film, is used as the sheet. This sheet is cut to obtain a film 410 illustrated in FIG. 6A.

Figure 6B:
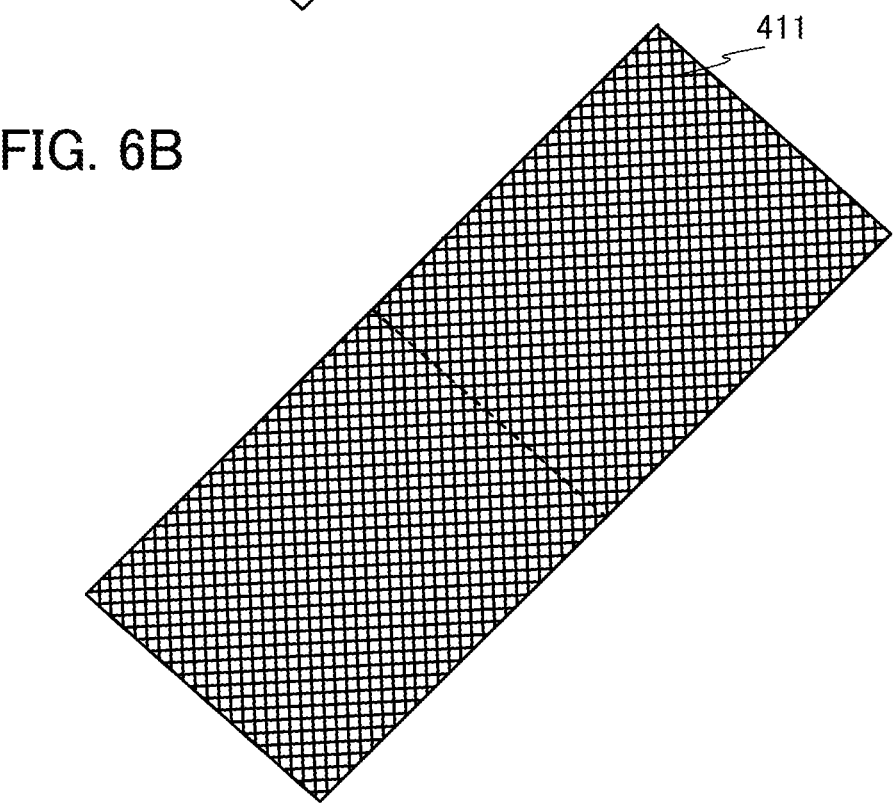

Then, the film 410 is embossed to form unevenness on the surface as illustrated in FIG. 6B so that the pattern can be visually recognized. Although an example in which the sheet is cut and then embossing is performed is described here, the order is not particularly limited; embossing may be performed before cutting the sheet and then the sheet may be cut. Alternatively, the sheet may be cut after thermocompression bonding is performed with the sheet bent.

Embossing, which is a kind of pressing, will be described.

Figure 8A:
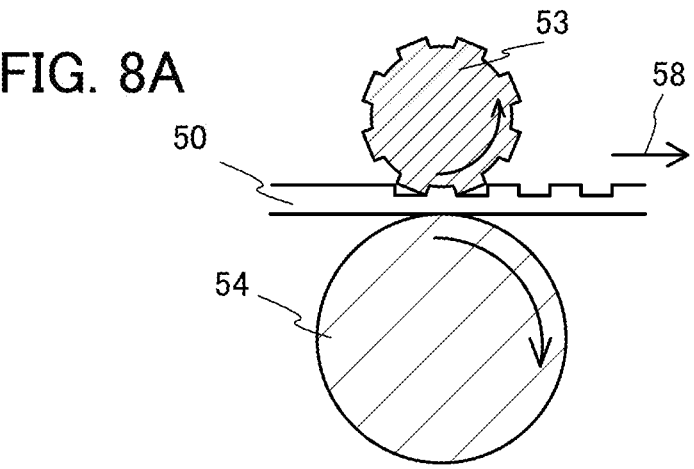
FIGS. 8A to 8C are diagrams each illustrating embossing according to one embodiment of the present invention.
Figure 8B:
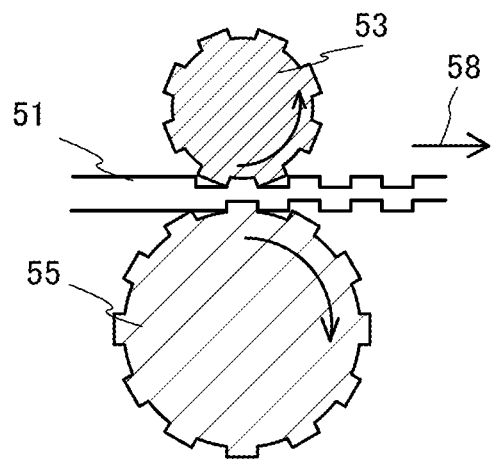
Figure 8C:
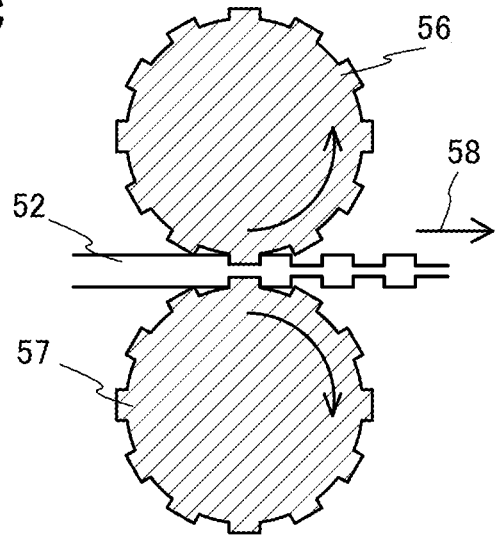

FIGS. 8A to 8C are cross-sectional views each illustrating an example of embossing. Note that embossing is a kind of pressing and refers to processing for forming unevenness corresponding to unevenness of an embossing roll on a surface of a film by bringing the embossing roll whose surface has unevenness into contact with the film with pressure. The embossing roll is a roll whose surface is patterned.

An example in which one surface of a film is embossed is illustrated in FIG. 8A.

FIG. 8A illustrates the state where a film 50 is sandwiched between an embossing roll 53 in contact with one surface of the film and a roll 54 in contact with the other surface and the film 50 is being transferred in a direction 58 of movement of the film 50. The surface of the film is patterned by pressure or heat.

Processing illustrated in FIG. 8A is called one-side embossing performed by a combination of the embossing roll 53 and the roll 54 (a metal roll or an elastic roll (e.g., rubber roll)).

An example in which both surfaces of a film are embossed is illustrated in FIG. 8B.

FIG. 8B illustrates the state where a film 51 is sandwiched between the embossing roll 53 in contact with one surface of the film and an embossing roll 55 in contact with the other surface and the film 51 is being transferred in the direction 58 of movement of the film 51.

Processing illustrated in FIG. 8B is called both-side embossing performed by a combination of the embossing roll 53 which has projections and the embossing roll 55 which has depressions.

The surface of the film 51 is patterned by unevenness which is continuously formed by projecting and depressing, so-called embossing and debossing, of part of the film.

FIG. 8C illustrates the state where a film 52 is sandwiched between an embossing roll 56 in contact with one surface of the film and an embossing roll 57 in contact with the other surface and the film 52 is being transferred in the direction 58 of movement of the film 52.

Processing illustrated in FIG. 8C is called Tip to Tip both-side embossing performed by a combination of the embossing roll 56 and the embossing roll 57 that has the same pattern as the embossing roll 56. The phases of the projections and depressions are the same between the two embossing rolls having the same pattern, so that substantially the same pattern can be formed on the top surface and the bottom surface of the film 52.

The embossing roll is not necessarily used, and an embossing plate may be used. Furthermore, embossing is not necessarily employed, and any method that allows formation of a relief on part of the film may be employed.

In this embodiment, both surfaces of the film 411 are provided with unevenness to have patterns, and the film 411 is folded at the center so that two end portions overlap with each other, and is sealed on three sides with an adhesive layer.

Figure 7A:
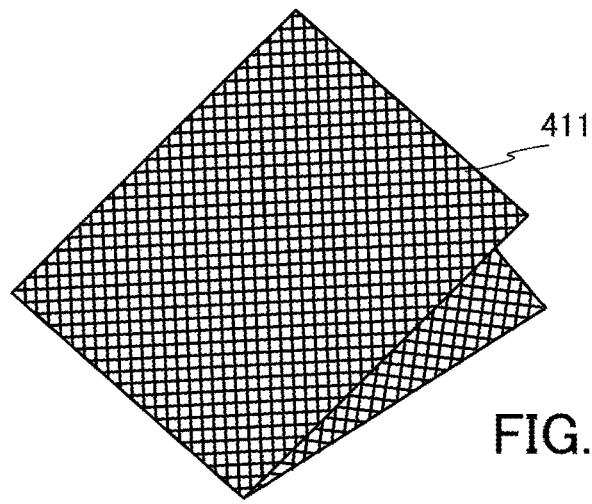
FIGS. 7A to 7D are perspective views.

The film 411 is folded along a dotted line in FIG. 6B so as to be in the state shown in FIG. 7A.

Figure 7C:
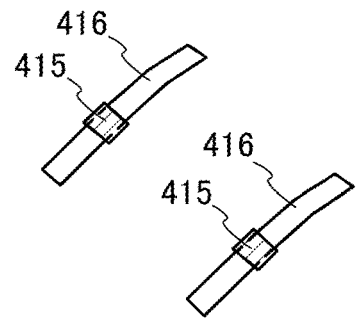
Figure 7B:
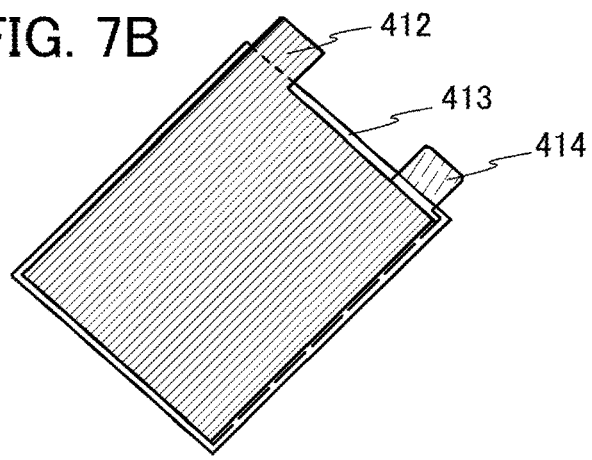

A positive electrode current collector 412, a separator 413, and a negative electrode current collector 414 that are stacked to constitute a secondary battery as illustrated in FIG. 7B are prepared. The current collectors such as the positive electrode current collector 412 and the negative electrode current collector 414 can each be formed using a highly conductive material which is not alloyed with a carrier ion such as a lithium ion, such as a metal typified by stainless steel, gold, platinum, zinc, iron, nickel, copper, aluminum, titanium, or tantalum or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collectors can each have a foil-like shape, a plate-like shape (sheet-like shape), a net-like shape, a cylindrical shape, a coil shape, a punching-metal shape, an expanded-metal shape, or the like as appropriate. The current collectors preferably have a thickness of greater than or equal to 10 µm and less than or equal to 30 µm. Note that the example in which one combination of the positive electrode current collector 412, the separator 413, and the negative electrode current collector 414 that are stacked is covered with an exterior body is illustrated here for simplicity. To increase the capacity of the secondary battery, a plurality of combinations may be stacked and covered with an exterior body.

In addition, two lead electrodes 416 with sealing layers 415 illustrated in FIG. 7C are prepared. The lead electrodes 416 are each also referred to as a lead terminal and provided in order to lead a positive electrode or a negative electrode of a secondary battery to the outside of an exterior film.

Then, one of the lead electrodes is electrically connected to a protruding portion of the positive electrode current collector 412 by ultrasonic welding or the like. The other lead electrode is electrically connected to a protruding portion of the negative electrode current collector 414 by ultrasonic welding or the like.

Then, two sides of the film 411 are sealed by thermocompression bonding, and one side is left open for introduction of an electrolytic solution. In thermocompression bonding, the sealing layers 415 provided over the lead electrodes are also melted, thereby fixing the lead electrodes and the film 411 to each other. After that, in a reduced-pressure atmosphere or an inert atmosphere, a desired amount of the electrolytic solution is introduced to the inside of the film 411 in the form of a bag. Lastly, the side of the film which has not been subjected to thermocompression bonding and is left open is sealed by thermocompression bonding.

Figure 7D:
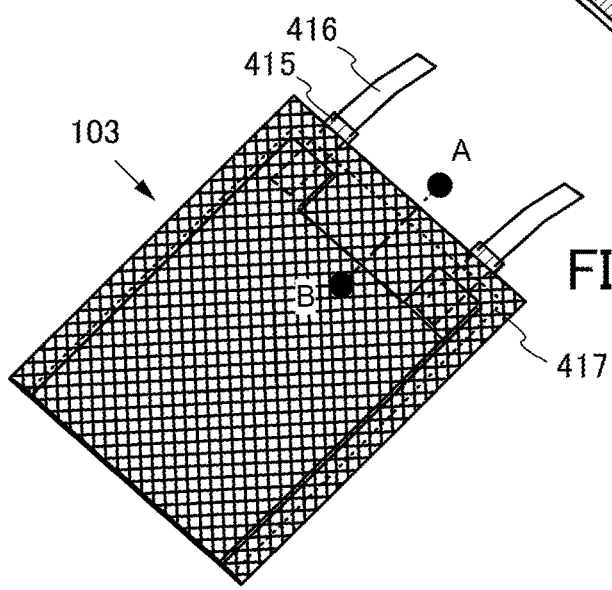

In this manner, the secondary battery 103 illustrated in FIG. 7D can be fabricated.

In the obtained secondary battery 103, the surface of the film 411 serving as an exterior body has a pattern including unevenness. A region between an end face and a dotted line in FIG. 7D is a thermocompression-bonded region 417. A surface of the thermocompression-bonded region 417 also has a pattern including unevenness. Although the unevenness in the thermocompression-bonded region 417 is smaller than that in a center portion, it can relieve stress applied when the secondary battery is bent.

Figure 7F:
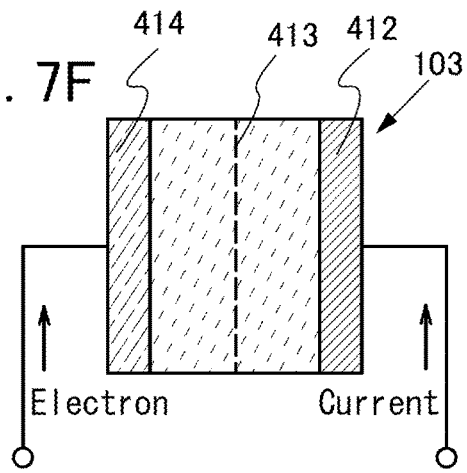
FIG. 7F is a circuit diagram each illustrating one embodiment of the present invention.
Figure 7E:
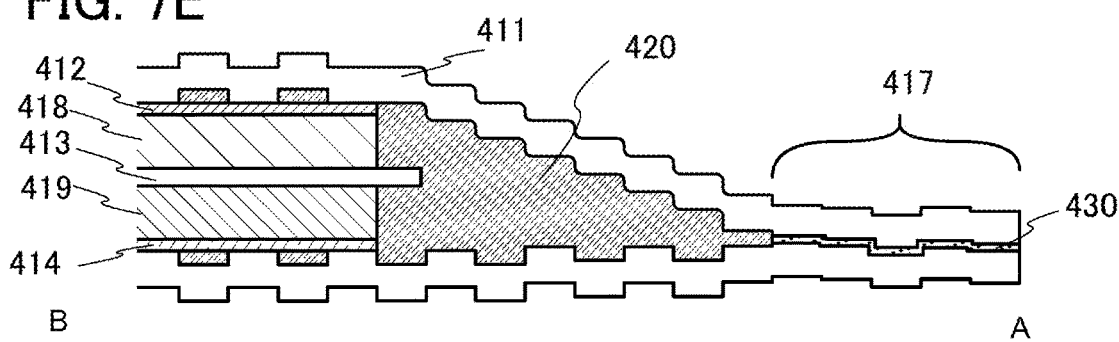
FIG. 7E is a cross-sectional view.

FIG. 7E illustrates an example of a cross section taken along dashed-dotted line A-B in FIG. 7D.

As illustrated in FIG. 7E, unevenness of the film 411 is different between a region overlapping with the positive electrode current collector 412 and the thermocompression-bonded region 417. As illustrated in FIG. 7E, the positive electrode current collector 412, a positive electrode active material layer 418, the separator 413, a negative electrode active material layer 419, and the negative electrode current collector 414 are stacked in this order and placed inside the folded film 411, an end portion is sealed with an adhesive layer 430, and the other space is filled with an electrolytic solution 420.

Examples of the positive electrode active material used for the positive electrode active material layer 418 include a composite oxide with an olivine crystal structure, a composite oxide with a layered rock-salt crystal structure, and a composite oxide with a spinel crystal structure. As the positive electrode active material, for example, a compound such as $LiFeO_2$, $LiCoO_2$, $LiNiO_2$, $LiMn_2O_4$, $V_2O_5$, $Cr_2O_5$, or $MnO_2$ is used.

Alternatively, a complex material ($LiMPO_4$ (general formula) (M is one or more of Fe(II), Mn(II), Co(II), and Ni(II))) can be used. Typical examples of the general formula $LiMPO_4$ which can be used as a material are lithium compounds such as LiFePO$_4$, LiNiPO$_4$, LiCoPO$_4$, LiMnPO$_4$, LiFe$_a$Ni$_b$PO$_4$, LiFe$_a$Co$_b$PO$_4$, LiFe$_a$Mn$_b$PO$_4$, LiNi$_a$Co$_b$PO$_4$, LiNi$_a$Mn$_b$PO$_4$ (a+b≤1, 0<a<1, and 0<b<1), LiFe$_c$Ni$_d$Co$_e$PO$_4$, LiFe$_c$Ni$_d$Mn$_e$PO$_4$, LiNi$_c$Co$_d$Mn$_e$PO$_4$ (c+d+e≤1, 0<c<1, 0<d<1, and 0<e<1), and LiFe$_f$Ni$_g$Co$_h$Mn$_i$PO$_4$ (f+g+h+i≤1, 0<f<1, 0<g<1, 0<h<1, and 0<i<1).

Alternatively, a complex material such as Li$_{(2-j)}$MSiO$_4$ (general formula) (M is one or more of Fe(II), Mn(II), Co(II), and Ni(II); 0≤j≤2) can be used. Typical examples of the general formula Li$_{(2-j)}$MSiO$_4$ which can be used as a material are lithium compounds such as Li$_{(2-j)}$FeSiO$_4$, Li$_{(2-j)}$NiSiO$_4$, Li$_{(2-j)}$CoSiO$_4$, Li$_{(2-j)}$MnSiO$_4$, Li$_{(2-j)}$Fe$_k$Ni$_l$SiO$_4$, Li$_{(2-j)}$Fe$_k$Co$_l$SiO$_4$, Li$_{(2-j)}$Fe$_k$Mn$_l$SiO$_4$, Li$_{(2-j)}$Ni$_k$Co$_l$SiO$_4$, Li$_{(2-j)}$Ni$_k$Mn$_l$SiO$_4$ (k+l≤1, 0<k<1, and 0<l<1), Li$_{(2-j)}$Fe$_m$Ni$_n$Co$_q$SiO$_4$, Li$_{(2-j)}$Fe$_m$Ni$_n$Mn$_q$SiO$_4$, Li$_{(2-j)}$Ni$_m$Co$_n$Mn$_q$SiO$_4$ (m+n+q≤1, 0<m<1, 0<n<1, and 0<q<1), and Li$_{(2-j)}$Fe$_r$Ni$_s$Co$_t$Mn$_u$SiO$_4$ (r+s+t+u≤1, 0<r<1, 0<s<1, 0<t<1, and 0<u<1).

Still alternatively, a nasicon compound expressed by A$_x$M$_2$(XO$_4$)$_3$ (general formula) (A=Li, Na, or Mg, M=Fe, Mn, Ti, V, Nb, or Al, X=S, P, Mo, W, As, or Si) can be used as the positive electrode active material. Examples of the nasicon compound are Fe$_2$(MnO$_4$)$_3$, Fe$_2$(SO$_4$)$_3$, and Li$_3$Fe$_2$(PO$_4$)$_3$. Further alternatively, a compound expressed by Li$_2$MPO$_4$F, Li$_2$MP$_2$O$_7$, or Li$_5$MO$_4$ (general formula) (M=Fe or Mn), a perovskite fluoride such as NaFeF$_3$ or FeF$_3$, a metal chalcogenide (a sulfide, a selenide, or a telluride) such as TiS$_2$ or MoS$_2$, an oxide with an inverse spinel crystal structure such as LiMVO$_4$, a vanadium oxide (V$_2$O$_5$, V$_6$O$_{13}$, LiV$_3$O$_8$, or the like), a manganese oxide, an organic sulfur compound, or the like can be used as the positive electrode active material.

In the case where carrier ions are alkali metal ions other than lithium ions or alkaline-earth metal ions, the following may be used as the positive electrode active material instead of lithium: an alkali metal (e.g., sodium or potassium) or an alkaline-earth metal (e.g., calcium, strontium, beryllium, magnesium, or barium).

As the separator 413, an insulator such as cellulose (paper), polypropylene with pores, or polyethylene with pores can be used.

As an electrolyte of an electrolyte solution, a material which contains carrier ions is used. Typical examples of the electrolyte are lithium salts such as LiPF$_6$, LiClO$_4$, LiAsF$_6$, LiBF$_4$, LiCF$_3$SO$_3$, Li(CF$_3$SO$_2$)$_2$N, and Li(C$_2$F$_5$SO$_2$)$_2$N. One of these electrolytes may be used alone or two or more of them may be used in an appropriate combination and in an appropriate ratio.

Note that when carrier ions are alkali metal ions other than lithium ions or alkaline-earth metal ions, instead of lithium in the above lithium salts, an alkali metal (e.g., sodium or potassium) or an alkaline-earth metal (e.g., calcium, strontium, beryllium, magnesium, or barium) may be used for the electrolyte.

As a solvent of the electrolytic solution, a material in which lithium ions can transfer is used. As the solvent of the electrolytic solution, an aprotic organic solvent is preferably used. Typical examples of the aprotic organic solvent include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent for the electrolyte solution, safety against liquid leakage and the like is improved. Furthermore, a storage battery can be thinner and more lightweight. Typical examples of the gelled high-molecular material include silicone gel, acrylic gel, acrylonitrile gel, polyethylene oxide, polypropylene oxide, a fluorine-based polymer, and the like. Alternatively, the use of one or more of ionic liquids (room temperature molten salts) which have features of non-flammability and non-volatility as a solvent of the electrolytic solution can prevent the storage battery from exploding or catching fire even when the storage battery internally shorts out or the internal temperature increases owing to overcharging or the like. An ionic liquid is a salt in the liquid state and has high ion mobility (conductivity). Furthermore, the ionic liquid includes a cation and an anion. Examples of such an ionic liquid are an ionic liquid containing an ethylmethylimidazolium (EMI) cation and an ionic liquid containing an N-methyl-N-propylpiperidinium (PP$_{13}$) cation.

Instead of the electrolytic solution, a solid electrolyte including an inorganic material such as a sulfide-based inorganic material or an oxide-based inorganic material, or a solid electrolyte including a high molecular material such as a polyethylene oxide (PEO)-based high molecular material may alternatively be used. In the case of using the solid electrolyte, a separator or a spacer is not necessary. Furthermore, the battery can be entirely solidified; therefore, there is no possibility of liquid leakage and thus the safety of the battery is dramatically increased.

A material with which lithium can be dissolved and precipitated or a material into and from which lithium ions can be inserted and extracted can be used for a negative electrode active material of the negative electrode active material layer 419; for example, lithium metal, a carbon-based material, or the like can be used.

The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of lithium metal (0.1 V to 0.3 V vs. Li/Li$^+$) while lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of lithium metal.

As a negative electrode active material, a material which enables charge-discharge reaction by alloying and dealloying reaction with lithium can be used. In the case where a carrier ion is a lithium ion, a material containing at least one of Al, Si, Ge, Sn, Pb, Sb, Bi, Ag, Au, Zn, Cd, In, Ga, and the like can be used, for example. Such elements have higher capacity than carbon. In particular, silicon has a significantly high theoretical capacity of 4200 mAh/g. For this reason, silicon is preferably used as the negative electrode active material. Examples of the material using such elements include SiO, Mg$_2$Si, Mg$_2$Ge, SnO, SnO$_2$, Mg$_2$Sn, SnS$_2$, V$_2$Sn$_3$, FeSn$_2$, CoSn$_2$, Ni$_3$Sn$_2$, Cu$_6$Sn$_5$, Ag$_3$Sn, Ag$_3$Sb, Ni$_2$MnSb, CeSb$_3$, LaSn$_3$, La$_3$Co$_2$Sn$_7$, CoSb$_3$, InSb, SbSn, and the like. Note that SiO refers to the powder of a silicon oxide including a silicon-rich portion and can also be referred to as SiO$_y$ (2>y>0). Examples of SiO include a material containing one or more of Si$_2$O$_3$, Si$_3$O$_4$, and Si$_2$O and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystal silicon, $Si_2O_3$, $Si_3O_4$, $Si_2O$, and $SiO_2$. Thus, SiO can be distinguished from $SiO_x$ (x is 2 or more), which is clear and colorless or white. Note that in the case where a secondary battery is fabricated using SiO as a material thereof and the SiO is oxidized because of repeated charge and discharge cycles, SiO is changed into $SiO_2$ in some cases.

Alternatively, for the negative electrode active material, an oxide such as titanium dioxide (e.g., $TiO_2$), lithium titanium oxide (e.g., $Li_4Ti_5O_{12}$), lithium-graphite intercalation compound (e.g., $Li_xC_6$), niobium pentoxide (e.g., $Nb_2O_5$), tungsten oxide (e.g., $WO_2$), or molybdenum oxide (e.g., $MoO_2$) can be used.

Still alternatively, as the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used as the negative electrode active material. For example, a transition metal oxide with which an alloying reaction with lithium is not caused, such as cobalt oxide (CoO), nickel oxide (NiO), or iron oxide (FeO), may be used as the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as the positive electrode active material because of its high potential.

The negative electrode active material layer 419 may further include a binder for increasing adhesion of active materials, a conductive additive for increasing the conductivity of the negative electrode active material layer 419, and the like in addition to the above negative electrode active materials.

In the secondary battery, for example, the separator 413 has a thickness of approximately 25 μm, the positive electrode current collector 412 has a thickness of approximately 20 μm to 40 μm, the positive electrode active material layer 418 has a thickness of approximately 100 μm, the negative electrode active material layer 419 has a thickness of approximately 100 μm, and the negative electrode current collector 414 has a thickness of approximately 20 μm to 40 μm. The film 411 has a thickness of 0.113 mm. The film 411 is embossed to a depth of approximately 500 μm. If the film 411 is embossed to a depth of greater than or equal to 2 mm, the whole secondary battery is too thick; thus, the film 411 is embossed to a depth of less than or equal to 1 mm, preferably less than or equal to 500 μm. Although the adhesive layer 430 is only partly shown in FIG. 7E, only a themocompression-bonded portion of a layer made of polypropylene which is provided on the surface of the film 411 is the adhesive layer 430.

FIG. 7E shows an example in which the bottom side of the film 411 is fixed and pressure-bonded. In this case, the top side is greatly bent and a step is formed. Thus, when a plurality of combinations of the above stacked layers (e.g., eight or more combinations) is provided inside the folded film 411, the step is large and the top side of the film 411 might be too stressed. Furthermore, an end face of the top side of the film might be greatly misaligned with an end face of the bottom side of the film. To prevent misalignment of the end faces, a step may also be provided for the bottom side of the film and pressure bonding may be performed at a center portion so that stress is uniformly applied.

Here, a current flow in charging a secondary battery will be described with reference to FIG. 7F. When a secondary battery using lithium is regarded as a closed circuit, lithium ions transfer and a current flows in the same direction. Note that in the secondary battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, whether it is at the time of charging or discharging is noted and whether it corresponds to a positive electrode or a negative electrode is also noted.

Two terminals in FIG. 7F are connected to a charger, and the secondary battery 103 is charged. As the charge of the secondary battery 103 proceeds, a potential difference between electrodes increases. The positive direction in FIG. 7F is the direction in which a current flows from one terminal outside the secondary battery 103 to the positive electrode current collector 412, flows from the positive electrode current collector 412 to the negative electrode current collector 414 in the secondary battery 103, and flows from the negative electrode to the other terminal outside the secondary battery 103. In other words, a current flows in the direction of a flow of a charging current.

Figure 9:
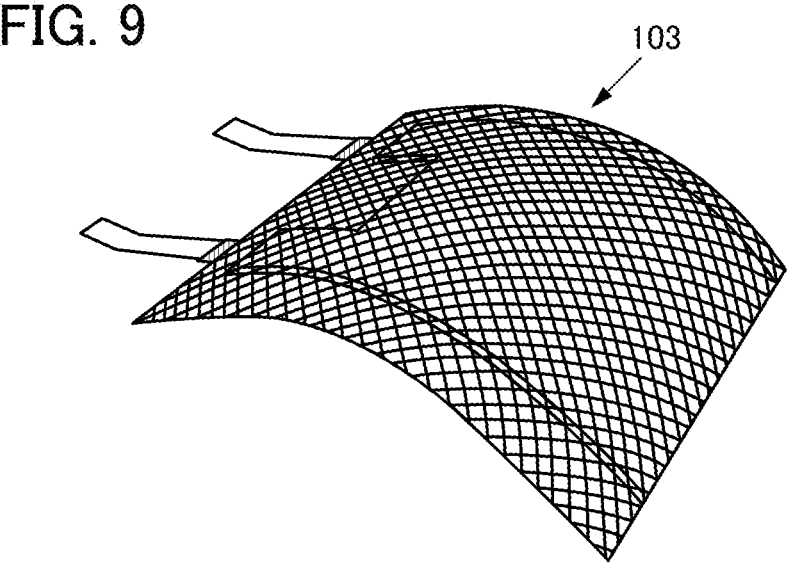
FIG. 9 is a perspective view of a secondary battery according to one embodiment of the present invention.

FIG. 9 is a perspective view illustrating a bent lithium-ion secondary battery. The lithium-ion secondary battery is not limited to be bent in the direction shown in FIG. 9 and can be bent in other directions. The form of the bent lithium-ion secondary battery is held by an embossed exterior body. The lithium-ion secondary battery in FIG. 9 can serve as a secondary battery also after being repeatedly bent. When the bent lithium-ion secondary battery is stored in a housing of an electronic device, buffer layers are preferably provided over and below or in the periphery of the bent lithium-ion secondary battery, whereby collision of the secondary battery with other components (films or elements) at the time of bending the electronic device can be relieved.

Although an example of application to a lithium-ion secondary battery is described in this embodiment, one embodiment of the present invention is not limited to this example. Application to a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, and an air battery is also possible. Application to a variety of power storage devices such as a primary battery, a capacitor, and a lithium-ion capacitor is also possible.

This embodiment can be freely combined with any of the other embodiments.

(Embodiment 4)

In this embodiment, a structure of an input/output device according to one embodiment of the present invention (a display panel including a touch input sensor) will be described with reference to FIGS. 10A to 10C and FIGS. 11A to 11C.

FIGS. 10A to 10C are projection views illustrating the structure of the input/output device according to one embodiment of the present invention.

FIG. 10A is the projection view illustrating an input/output device 500 according to one embodiment of the present invention. FIG. 10B is the projection view illustrating the structure of a sensing unit 20U included in the input/output device 500.

Figure 11A:
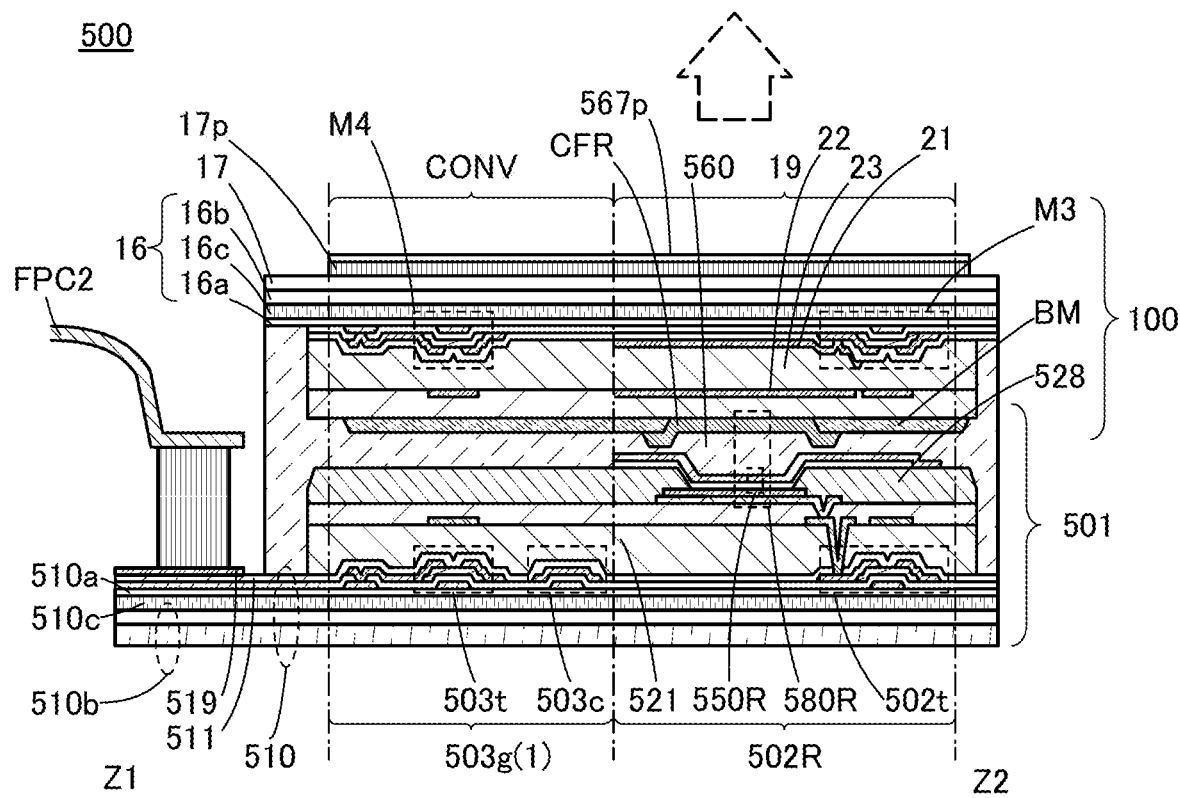
FIGS. 11A to 11C are cross-sectional views illustrating a structure of an input/output device according to one embodiment of the present invention.
Figure 11B:
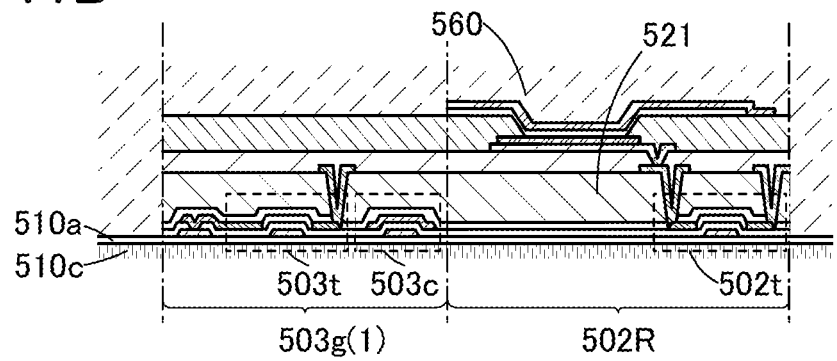
Figure 11C:
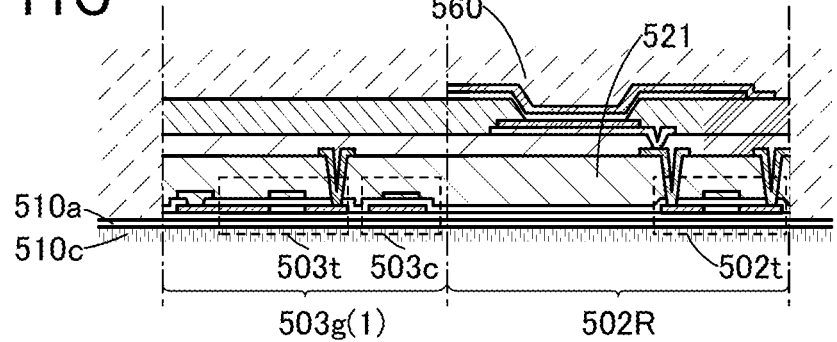

FIGS. 11A to 11C are cross-sectional views illustrating structures of the input/output device 500 according to one embodiment of the present invention.

FIG. 11A is the cross-sectional view along Z1-Z2 of the input/output device 500 according to one embodiment of the present invention that is illustrated in FIGS. 10A to 10C.

Note that the input/output device 500 can also be referred to as a touchscreen.

<Structural Example 1 of Input/Output Device>

The input/output device 500 described in this embodiment includes a flexible input device 100 and a display portion 501 (see FIGS. 10A to 10C). The flexible input device 100 is provided with a plurality of sensing units 20U arranged in a matrix and including window portions 14 that transmit visible light; a scan line G1 electrically connected to the plurality of sensing units 20U arranged in the row direction (shown by an arrow R in FIG. 10A); a signal line DL electrically connected to the plurality of sensing units 20U arranged in the column direction (shown by an arrow C in FIG. 10A); and a flexible base 16 supporting the sensing units 20U, the scan line G1, and the signal line DL. The display portion 501 is provided with a plurality of pixels 502 overlapping with the window portions 14 and arranged in a matrix; and a flexible substrate 510 supporting the pixels 502.

The sensing unit 20U includes a sensing element C overlapping with the window portions 14 and a sensing circuit 19 electrically connected to the sensing element C (see FIG. 10B).

The sensing element C includes an insulating layer 23 and a first electrode 21 and a second electrode 22 between which the insulating layer 23 is sandwiched (see FIG. 11A).

The sensing circuit 19 is supplied with a selection signal, and supplies a sensing signal DATA in accordance with a change in the capacity of the sensing element C.

The scan line G1 can supply a selection signal. The signal line DL can supply the sensing signal DATA. The sensing circuit 19 is provided so as to overlap with a gap between the window portions 14.

The input/output device 500 described in this embodiment further includes coloring layers between the sensing units 20U and the pixels 502 overlapping with the window portions 14 of the sensing units 20U.

The input/output device 500 described in this embodiment includes the flexible input device 100 provided with the plurality of sensing units 20U including the window portions 14 that transmit visible light and the flexible display portion 501 provided with the plurality of pixels 502 overlapping with the window portions 14. In addition, the coloring layers are provided between the window portions 14 and the pixels 502.

With such a structure, the input/output device can supply a sensing signal depending on a change in capacity and the positional data of the sensing unit that supplies the sensing signal, can display image data associated with the positional data of the sensing unit, and can be bent. Thus, the novel input/output device can be highly convenient or reliable.

The input/output device 500 may be provided with a flexible substrate FPC1 that is supplied with a signal supplied from the input device 100 and/or a flexible substrate FPC2 that supplies a signal containing image data to the display portion 501.

The input/output device 500 may also be provided with a protective layer 17p that protects the input/output device 500 from suffering flaws and/or an anti-reflective layer 567p that reduces the intensity of external light the input/output device 500 reflects.

The input/output device 500 also includes a scan line driver circuit 503g that supplies a selection signal to the scan line of the display portion 501 and a terminal 519 electrically connected to the flexible substrate FPC2 and a wiring 511 that supplies a signal.

Components of the input/output device 500 are described below. Note that in some cases, these components cannot be clearly distinguished and one component may also serve as another component or include part of another component.

For example, the input device 100 provided with the coloring layers overlapping with the plurality of window portions 14 also serves as a color filter.

For example, the input/output device 500 in which the input device 100 overlaps with the display portion 501 serves as the input device 100 and the display portion 501. The input/output device 500 includes the input device 100 and the display portion 501 (see FIG. 10A).

The input device 100 is provided with the plurality of sensing units 20U and the flexible base 16 supporting the sensing units. For example, the plurality of sensing units 20U are arranged in a matrix of 40 rows and 15 columns over the flexible base 16.

The window portion 14 transmits visible light.

The coloring layer that transmits light of a predetermined color is provided so as to overlap with the window portion 14. For example, a coloring layer CFB that transmits blue light, a coloring layer CFG that transmits green light, or a coloring layer CFR that transmits red light is provided (see FIG. 10B).

Note that besides the coloring layer that transmits blue light, the coloring layer that transmits green light, and/or the coloring layer that transmits red light, a coloring layer that transmits light of any of a variety of colors such as white and yellow can also be provided.

A metal material, pigment, dye, or the like can be used for the coloring layer.

A light-blocking layer BM is provided so as to surround the window portions 14. The light-blocking layer BM transmits light less easily than the window portions 14.

Carbon black, a metal oxide, a composite oxide containing a solid solution of a plurality of metal oxides, or the like can be used for the light-blocking layer BM.

The scan line G1, the signal line DL, a wiring VPI, a wiring RES, a wiring VRES, and the sensing circuit 19 are provided so as to overlap with the light-blocking layer BM.

Note that a light-transmitting overcoat layer can be provided so as to cover the coloring layers and the light-blocking layer BM.

The sensing element C includes the first electrode 21, the second electrode 22, and the insulating layer 23 between the first electrode 21 and the second electrode 22 (see FIG. 11A).

The first electrode 21 is formed in, for example, an island shape so as to be separated from other regions. A layer that can be formed in the same process as the first electrode 21 is particularly preferably provided in the proximity of the first electrode 21 so that the first electrode 21 is not recognized by a user of the input/output device 500. It is more preferred that the number of the window portions 14 provided in a gap between the first electrode 21 and the layer provided in the proximity of the first electrode 21 be as small as possible. It is particularly preferred that the window portions 14 be not provided in the gap.

The second electrode 22 is provided so as to overlap with the first electrode 21, and the insulating layer 23 is provided between the first electrode 21 and the second electrode 22.

For example, when a sensing target (specifically, a finger or the like) having a dielectric constant different from that of the air approaches the first electrode 21 or the second electrode 22 of the sensing element C placed in the air, the capacity of the sensing element C is changed. Thus, the sensing element C can be used as a proximity sensor.

For example, the capacity of the sensing element C that can change its form varies with the change in the form of the sensing element C.

Specifically, when a sensing target such as a finger touches the sensing element C and a gap between the first electrode 21 and the second electrode 22 becomes small, the capacity of the sensing element C increases. Thus, the sensing element C can be used as a contact sensor.

Alternatively, when the sensing element C is folded, the gap between the first electrode 21 and the second electrode 22 becomes small. Consequently, the capacity of the sensing element C increases. Thus, the sensing element C can be used as a folding sensor.

The first electrode 21 and the second electrode 22 are formed using a conductive material.

For example, an inorganic conductive material, an organic conductive material, metal, conductive ceramics, or the like can be used for the first electrode 21 and the second electrode 22.

Specifically, a metal element selected from aluminum, chromium, copper, tantalum, titanium, molybdenum, tungsten, nickel, silver, and manganese; an alloy containing any of the above-described metal elements as a component; an alloy containing any of the above-described metal elements in combination; or the like can be used.

Alternatively, a conductive oxide such as indium oxide, indium tin oxide, indium zinc oxide, zinc oxide, or zinc oxide to which gallium is added can be used.

Alternatively, graphene or graphite can be used. A film containing graphene can be formed, for example, by reducing a film containing graphene oxide. As a reducing method, a method using heat, a method using a reducing agent, or the like can be employed.

Alternatively, a conductive high molecule can be used.

The sensing circuit 19 includes, for example, a first transistor M1 to a third transistor M3 as illustrated in FIG. 12A. The sensing circuit 19 also includes wirings that supply power supply potentials and signals, such as the signal line DL, the wiring VPI, a wiring CS, the scan line G1, the wiring RES, and the wiring VRES. Note that the specific configuration of the sensing circuit 19 will be described in detail in Embodiment 5.

Note that the sensing circuit 19 may be provided so as not to overlap with the window portions 14. For example, the wirings are provided so as not to overlap with the window portions 14, whereby an object on one side of the sensing unit 20U can be easily viewed from the other side.

The first transistor M1 to the third transistor M3 can be formed in the same process, for example.

The first transistor M1 includes a semiconductor layer. For example, a Group 4 element, a compound semiconductor, or an oxide semiconductor can be used for the semiconductor layer. Specifically, a silicon-containing semiconductor, a gallium arsenide-containing semiconductor, an indium-containing oxide semiconductor, or the like can be used.

A conductive material can be used for the wirings.

For example, an inorganic conductive material, an organic conductive material, metal, conductive ceramics, or the like can be used for the wirings. Specifically, the materials that can be used for the first electrode 21 and the second electrode 22 can be used.

A metal material such as aluminum, gold, platinum, silver, nickel, titanium, tungsten, chromium, molybdenum, iron, cobalt, copper, or palladium or an alloy material containing any of the metal materials can be used for the scan line G1, the signal line DL, the wiring VPI, the wiring RES, and the wiring VRES.

Films formed over the base 16 may be processed into the sensing circuit 19.

Alternatively, the sensing circuit 19 formed on any other base may be transferred to the base 16.

Note that a manufacturing method of the sensing circuit will be described in detail in Embodiment 5.

As a material of the flexible base 16, an organic material, an inorganic material, or a composite material of an organic material and an inorganic material can be used.

The base 16 can be formed using a material with a thickness in the range from 5 μm to 2500 μm, preferably from 5 μm to 680 μm, more preferably from 5 μm to 170 μm, more preferably from 5 μm to 45 μm, more preferably from 8 μm to 25 μm.

In addition, a material with which passage of impurities is inhibited can be favorably used for the substrate 510. For example, a material with a vapor permeability of lower than or equal to $10^{-5}$ g/(m$^2$·day), preferably lower than or equal to $10^{-6}$ g/(m$^2$·day) can be favorably used.

The base 16 can be favorably formed using a material whose coefficient of linear expansion is substantially equal to that of the material of the substrate 510. For example, the coefficient of linear expansion of the material is preferably lower than or equal to $1\times10^{-3}$/K, more preferably lower than or equal to $5\times10^{-5}$/K, still more preferably lower than or equal to $1\times10^{-5}$/K.

Examples of the material of the base 16 are organic materials such as a resin, a resin film, and a plastic film.

Examples of the material of the base 16 are inorganic materials such as a metal plate and a thin glass plate with a thickness of greater than or equal to 10 μm and less than or equal to 50 μm.

Examples of the material of the base 16 are composite materials such as resin films to which a metal plate, a thin glass plate, or a film of an inorganic material is attached using a resin layer.

Examples of the material of the base 16 are composite materials such as a resin or a resin film into which a fibrous or particulate metal, glass, or inorganic material is dispersed.

For example, a thermosetting resin or an ultraviolet curable resin can be used for a resin layer.

Specifically, a resin film or resin plate of polyester, polyolefin, polyamide, polyimide, polycarbonate, an acrylic resin, or the like can be used.

Specifically, non-alkali glass, soda-lime glass, potash glass, crystal glass, or the like can be used.

Specifically, a metal oxide film, a metal nitride film, a metal oxynitride film, or the like can be used. For example, silicon oxide, silicon nitride, silicon oxynitride, an alumina film, or the like can be used.

Alternatively, SUS, aluminum, or the like provided with an opening can be used.

Alternatively, a resin such as an acrylic resin, a urethane resin, an epoxy resin, or a resin having a siloxane bond can be used.

For example, a stack in which a flexible base 16b, a barrier film 16a that prevents diffusion of impurities, and a resin layer 16c that bonds the barrier film 16a to the base 16b are stacked can be favorably used for the base 16 (see FIG. 11A).

A film including a stacked material in which a 600-nm-thick silicon oxynitride film and a 200-nm-thick silicon nitride film are stacked can be specifically used as the barrier film 16a.

Specifically, a film including a stacked material of a 600-nm-thick silicon oxynitride film, a 200-nm-thick silicon nitride film, a 200-nm-thick silicon oxynitride film, a 140-nm-thick silicon nitride oxide film, and a 100-nm-thick silicon oxynitride film stacked in this order can be used as the barrier film 16a.

Specifically, a resin film, resin plate, or a stack of polyester, polyolefin, polyamide, polyimide, polycarbonate, an acrylic resin, or the like can be used as the base 16b.

For example, a material that includes polyester, polyolefin, polyamide (e.g., nylon or aramid), polyimide, polycarbonate, an acrylic resin, a urethane resin, an epoxy resin, or a resin having a siloxane bond can be used for the resin layer 16c.

A flexible protective base 17 and/or the protective layer 17p can be provided. The flexible protective base 17 or the protective layer 17p protects the input device 100 from suffering flaws.

For example, a resin film, resin plate, stack, or the like of polyester, polyolefin, polyamide, polyimide, polycarbonate, an acrylic resin, or the like can be used as the protective base 17.

For example, a hard coat layer or a ceramic coat layer can be used as the protective layer 17p. Specifically, a layer containing a UV curable resin or aluminum oxide may be formed so as to overlap with the second electrode 22.

The display portion 501 includes the plurality of pixels 502 arranged in a matrix (see FIG. 10C).

For example, the pixel 502 includes a sub-pixel 502B, a sub-pixel 502G, and a sub-pixel 502R. Each sub-pixel includes a display element and a pixel circuit that drives the display element.

Note that the sub-pixel 502B in the pixel 502 is positioned so as to overlap with the coloring layer CFB, the sub-pixel 502G is positioned so as to overlap with the coloring layer CFG, and the sub-pixel 502R is positioned so as to overlap with the coloring layer CFR.

In this embodiment, an example of using an organic electroluminescent element that emits white light as a display element will be described; however, the display element is not limited to such an element.

For example, organic electroluminescent elements that emit light of different colors may be included in sub-pixels so that the light of different colors can be emitted from the respective sub-pixels.

In the display portion, an active matrix method in which an active element is included in a pixel or a passive matrix method in which an active element is not included in a pixel can be used.

In an active matrix method, as an active element (a non-linear element), not only a transistor but also various active elements (non-linear elements) can be used. For example, an MIM (metal insulator metal), a TFD (thin film diode), or the like can also be used. Since such an element has few numbers of manufacturing steps, manufacturing cost can be reduced or yield can be improved. Alternatively, since the size of the element is small, the aperture ratio can be improved, so that power consumption can be reduced or higher luminance can be achieved.

As a method other than the active matrix method, the passive matrix method in which an active element (a non-linear element) is not used can also be used. Since an active element (a non-linear element) is not used, the number of manufacturing steps is small, so that manufacturing cost can be reduced or yield can be improved. Alternatively, since an active element (a non-linear element) is not used, the aperture ratio can be improved, so that power consumption can be reduced or higher luminance can be achieved, for example.

A flexible material can be used for the substrate 510. For example, a material that can be used for the base 16 can be used for the substrate 510.

A stack in which a flexible substrate 510b, an insulating layer 510a that prevents diffusion of impurities, and a resin layer 510c that bonds the insulating layer 510a to the substrate 510b are stacked can be favorably used for the substrate 510, for example (see FIG. 11A).

A sealing layer 560 attaches the base 16 to the substrate 510. The sealing layer 560 has a refractive index higher than that of air. In the case of extracting light to the sealing layer 560 side, the sealing layer 560 has a function of optical adhesion.

The pixel circuits and the light-emitting elements (e.g., a light-emitting element 550R) are provided between the substrate 510 and the base 16.

The sub-pixel 502R includes a light-emitting module 580R.

The sub-pixel 502R includes the light-emitting element 550R and the pixel circuit including a transistor 502t, which can supply electric power to the light-emitting element 550R. Furthermore, the light-emitting module 580R includes the light-emitting element 550R and an optical element (e.g., the coloring layer CFR).

The light-emitting element 550R includes a lower electrode, an upper electrode, and a layer containing a light-emitting organic compound between the lower electrode and the upper electrode.

The light-emitting module 580R includes the coloring layer CFR on the light extraction side. The coloring layer transmits light of a particular wavelength and is, for example, a layer that selectively transmits light of red, green, or blue color. Note that some other sub-pixels may be provided so as to overlap with the window portions, which are not provided with the coloring layers, so that light from the light-emitting elements can be emitted without passing through the coloring layers.

In the case where the sealing layer 560 is provided on the light extraction side, the sealing layer 560 is in contact with the light-emitting element 550R and the coloring layer CFR.

The coloring layer CFR overlaps with the light-emitting element 550R. Accordingly, part of light emitted from the light-emitting element 550R passes through the coloring layer CFR and is emitted to the outside of the light-emitting module 580R as indicated by an arrow in FIG. 11A.

The light-blocking layer BM is located so as to surround the coloring layer (e.g., the coloring layer CFR).

An insulating film 521 covering the transistor 502t included in the pixel circuit is provided. The insulating film 521 can be used as a layer for planarizing unevenness caused by the pixel circuits. A stacked film including a layer that can prevent diffusion of impurities can be used as the insulating film 521. This can prevent the reliability of the transistor 502t or the like from being lowered by diffusion of impurities.

The lower electrode is provided over the insulating film 521, and a partition wall 528 is provided over the insulating film 521 so as to overlap with an end portion of the lower electrode.

The lower electrode is included in the light-emitting element (e.g., the light-emitting element 550R); the layer containing a light-emitting organic compound is provided between the upper electrode and the lower electrode. The pixel circuit supplies electric power to the light-emitting element.

Furthermore, a spacer that adjusts a gap between the base 16 and the substrate 510 is provided over the partition wall 528.

A scan line driver circuit 503g(1) includes a transistor 503t and a capacitor 503c. Note that transistors used in the pixel circuit and the driver circuit can be formed in the same process and over the same substrate.

Any of various circuits that can convert the sensing signal DATA supplied from the sensing unit 20U and supply a signal obtained by the conversion to the FPC1 can be used for a converter CONV (see FIG. 10A and FIG. 11A).

For example, as illustrated in FIG. 12A, a fourth transistor M4 can be used in the converter CONV.

<<Other Structures>>

The display portion 501 includes the anti-reflective layer 567p positioned in a region overlapping with pixels. As the anti-reflective layer 567p, a circular polarizing plate can be used, for example.

The display portion 501 includes the wiring 511 through which signals can be supplied. The wiring 511 is provided with the terminal 519. Note that the flexible substrate FPC2 through which a signal such as an image signal or a synchronization signal can be supplied is electrically connected to the terminal 519.

Note that a printed wiring board (PWB) may be attached to the flexible substrate FPC2.

The display portion 501 includes wirings such as scan lines, signal lines, and power supply lines. Any of various conductive films can be used as the wirings.

Specifically, a metal element selected from aluminum, chromium, copper, tantalum, titanium, molybdenum, tungsten, nickel, yttrium, zirconium, silver, and manganese; an alloy containing any of the above-described metal elements as a component; an alloy containing any of the above-described metal elements in combination; or the like can be used. In particular, one or more elements selected from aluminum, chromium, copper, tantalum, titanium, molybdenum, and tungsten are preferably contained. In particular, an alloy of copper and manganese is suitably used in microfabrication with the use of a wet etching method.

Specifically, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, or the like can be used.

Specifically, a stacked structure in which an alloy film or a nitride film containing one or more elements selected from titanium, tantalum, tungsten, molybdenum, chromium, neodymium, and scandium is stacked over an aluminum film can be used.

Alternatively, a light-transmitting conductive material containing indium oxide, tin oxide, or zinc oxide may be used.

<Modification Example of Display Portion>

Any of various kinds of transistors can be used in the display portion 501.

A structure in which bottom-gate transistors are used in the display portion 501 is illustrated in FIGS. 11A and 11B.

For example, a semiconductor layer containing an oxide semiconductor, amorphous silicon, or the like can be used in the transistor 502t and the transistor 503t illustrated in FIG. 11A.

For example, a semiconductor layer containing polycrystalline silicon that is obtained by crystallization process such as laser annealing can be used in the transistor 502t and the transistor 503t illustrated in FIG. 11B.

A structure in the case of using top-gate transistors in the display portion 501 is illustrated in FIG. 11C.

For example, a semiconductor layer containing polycrystalline silicon, a single crystal silicon film that is transferred from a single crystal silicon substrate, or the like can be used in the transistor 502t and the transistor 503t illustrated in FIG. 11C.

This embodiment can be combined with any of the other embodiments in this specification as appropriate.

(Embodiment 5)

In this embodiment, the configuration and driving methods of a sensing circuit that can be used for the sensing unit in the input/output device according to one embodiment of the present invention will be described with reference to FIGS. 12A, 12B-1, and 12B-2.

FIGS. 12A, 12B-1, and 12B-2 illustrate the configuration and driving methods of the sensing circuit 19 and the converter CONV according to one embodiment of the present invention.

FIG. 12A is a circuit diagram illustrating the configuration of the sensing circuit 19 and the converter CONV according to one embodiment of the present invention. FIGS. 12B-1 and 12B-2 are timing charts illustrating the driving methods.

The sensing circuit 19 according to one embodiment of the present invention includes the first transistor M1 whose gate is electrically connected to the first electrode 21 of the sensing element C and whose first electrode is electrically connected to the wiring VPI that can supply a ground potential, for example (see FIG. 12A).

The sensing circuit 19 may further include the second transistor M2 whose gate is electrically connected to the scan line G1 that can supply a selection signal, whose first electrode is electrically connected to a second electrode of the first transistor M1, and whose second electrode is electrically connected to the signal line DL that can supply the sensing signal DATA, for example.

The sensing circuit 19 may further include the third transistor M3 whose gate is electrically connected to the wiring RES that can supply a reset signal, whose first electrode is electrically connected to the first electrode 21 of the sensing element C, and whose second electrode is electrically connected to the wiring VRES that can supply a ground potential, for example.

The capacity of the sensing element C varies, for example, when an object gets closer to the first electrode 21 or the second electrode 22 or when a gap between the first electrode 21 and the second electrode 22 is changed. Thus, the sensing unit 20U can supply the sensing signal DATA in accordance with a change in the capacity of the sensing element C.

The sensing unit 20U is provided with the wiring CS that can supply a control signal for controlling the potential of the second electrode 22 of the sensing element C.

Note that a portion where the first electrode 21 of the sensing element C, the gate of the first transistor M1, and the first electrode of the third transistor M3 are electrically connected is referred to as a node A.

The wiring VRES and the wiring VPI can supply, for example, a ground potential. A wiring VPO and a wiring BR can supply, for example, a high power supply potential.

The wiring RES can supply a reset signal. The scan line G1 can supply a selection signal. The wiring CS can supply a control signal for controlling the potential of the second electrode 22 of the sensing element C.

The signal line DL can supply the sensing signal DATA. A terminal OUT can supply a signal obtained by conversion based on the sensing signal DATA.

Note that any of various circuits that can convert the sensing signal DATA and supply a signal obtained by the conversion to the terminal OUT can be used for the converter CONV. The converter CONV may be electrically connected to the sensing circuit 19 to form a source follower circuit, a current mirror circuit, or the like, for example.

Specifically, a source follower circuit can be formed using the converter CONV including the fourth transistor M4 (see FIG. 12A). Note that the fourth transistor M4 may be formed in the same process as the first transistor M1 to the third transistor M3.

The first transistor M1 to the third transistor M3 each include a semiconductor layer. For example, a Group 4 element, a compound semiconductor, or an oxide semiconductor can be used for the semiconductor layer. Specifically, a silicon-containing semiconductor, a gallium arsenide-containing semiconductor, an indium-containing oxide semiconductor, or the like can be used.

<Driving Method of Sensing Circuit 19>

The driving method of the sensing circuit 19 will be described.

<<First Step>>

In a first step, after the third transistor M3 is turned on, a reset signal for turning off the third transistor M3 is supplied to the gate of the third transistor M3, so that the potential of the first electrode 21 of the sensing element C is set to a predetermined potential (see Period T1 in FIG. 12B-1).

Specifically, the wiring RES is made to supply a reset signal. The third transistor M3 supplied with the reset signal renders the potential of the node A a ground potential, for example (see FIG. 12A).

<<Second Step>>

In a second step, a selection signal for turning on the second transistor M2 is supplied to the gate of the second transistor M2, so that the second electrode of the first transistor M1 is electrically connected to the signal line DL.

Specifically, the scan line G1 is made to supply a selection signal. The second transistor M2 supplied with the selection signal electrically connects the second electrode of the first transistor M1 and the signal line DL (see Period T2 in FIG. 12B-1).

<<Third Step>>

In a third step, a control signal is supplied to the second electrode 22 of the sensing element C, and the control signal and the potential that varies depending on the capacity of the sensing element C are supplied to the gate of the first transistor M1.

Specifically, the wiring CS is made to supply a rectangular control signal. The sensing element C whose second electrode 22 is supplied with the rectangular control signal increases the potential of the node A in accordance with the capacity of the sensing element C (see the latter part of Period T2 in FIG. 12B-1).

For example, when the sensing element C is placed in the air and an object having a higher dielectric constant than the air is placed in the proximity of the second electrode 22 of the sensing element C, the apparent capacity of the sensing element C is increased.

Thus, a change in the potential of the node A caused by the rectangular control signal is smaller than that when an object having a higher dielectric constant than the air is not placed in the proximity of the second electrode 22 of the sensing element C (see a solid line in FIG. 12B2).

<<Fourth Step>>

In a fourth step, a signal caused by a change in the potential of the gate of the first transistor M1 is supplied to the signal line DL.

For example, a change in current caused by a change in the potential of the gate of the first transistor M1 is supplied to the signal line DL.

The converter CONV converts a change in current flowing through the signal line DL into a voltage change and supplies the voltage change.

<<Fifth Step>>

In a fifth step, a selection signal for turning off the second transistor M2 is supplied to the gate of the second transistor M2.

In this embodiment, an example of a structure in which a display element and a touch sensor element are provided between a pair of film substrates, that is, a so-called in-cell structure is described; however, one embodiment of the present invention is not limited thereto. A structure in which a display panel provided with a display element between a pair of film substrates and a film substrate provided with a touch sensor element overlap with each other, that is, a so-called on-cell structure can be used. In the case of employing the on-cell structure, the number of film substrates is larger than that of the in-cell structure by one or two, which results in a lager thickness.

(Embodiment 6)

In this embodiment, examples of an electronic device are described with reference to FIGS. 13A to 13H.

Examples of an electronic device using a flexible power storage device are as follows: display devices (also referred to as televisions or television receivers) such as head mounted displays and goggle type displays, desktop personal computers, laptop personal computers, monitors for computers or the like, cameras such as digital cameras or digital video cameras, digital photo frames, electronic notebooks, e-book readers, electronic translators, toys, audio input devices such as microphones, electric shavers, electric toothbrushes, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashers, dish dryers, clothes dryers, futon dryers, electric refrigerators, electric freezers, electric refrigerator-freezers, freezers for preserving DNA, flashlights, electric power tools, alarm devices such as smoke detectors, gas alarm devices, and security alarm devices, industrial robots, health equipment and medical equipment such as hearing aids, cardiac pacemakers, X-ray equipment, radiation counters, electric massagers, and dialyzers, mobile phones (also referred to as mobile phone devices or cell phones), portable game machines, portable information terminals, lighting devices, headphone stereos, stereos, remote controls, clocks such as table clocks and wall clocks, cordless phone handsets, transceivers, pedometers, calculators, portable or stationary music reproduction devices such as digital audio players, and large game machines such as pachinko machines.

In addition, a flexible power storage device can be incorporated along a curved inside/outside wall surface of a house or a building or a curved interior/exterior surface of a car. Also in this case, it is effective that a buffer layer be provided to overlap with the flexible power storage device.

Figure 13A:
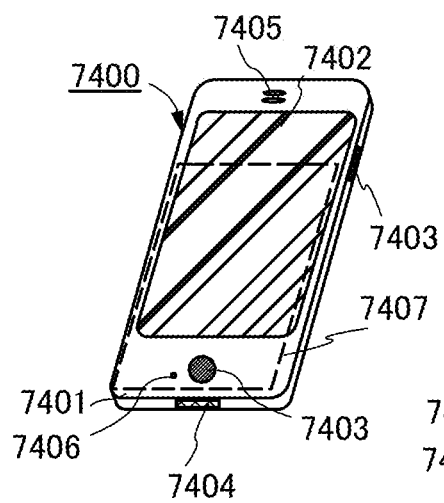
FIGS. 13A to 13H are diagrams illustrating electronic devices including flexible secondary batteries.

FIG. 13A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 13B:
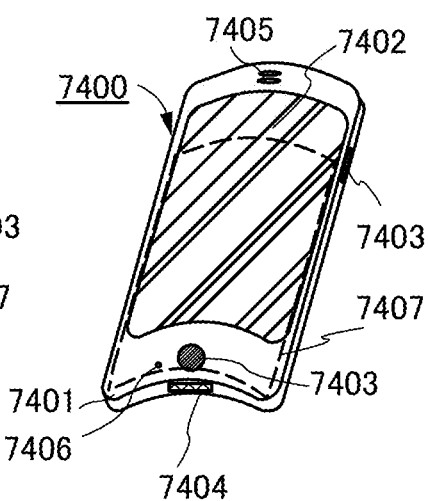
Figure 13C:
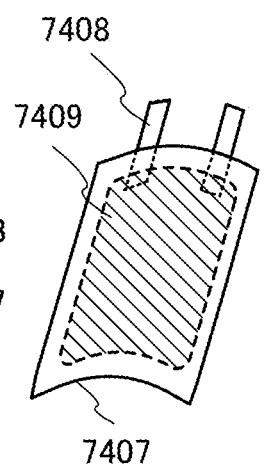

FIG. 13B illustrates the mobile phone 7400 that is bent. When the whole mobile phone 7400 is bent by external force, the power storage device 7407 included in the mobile phone 7400 is also bent. FIG. 13C illustrates the bent power storage device 7407. The power storage device 7407 is a laminated storage battery (also referred to as a layered battery or a film-covered battery). The power storage device 7407 is fixed while being bent. Note that the power storage device 7407 includes a lead electrode 7408 electrically connected to a current collector 7409. For example, a film serving as an exterior body of the power storage device 7407 is embossed, so that the power storage device 7407 has high reliability even when bent. The mobile phone 7400 may further be provided with a slot for insertion of a SIM card, a connector portion for connecting a USB device such as a USB memory, and the like.

Figure 13D:
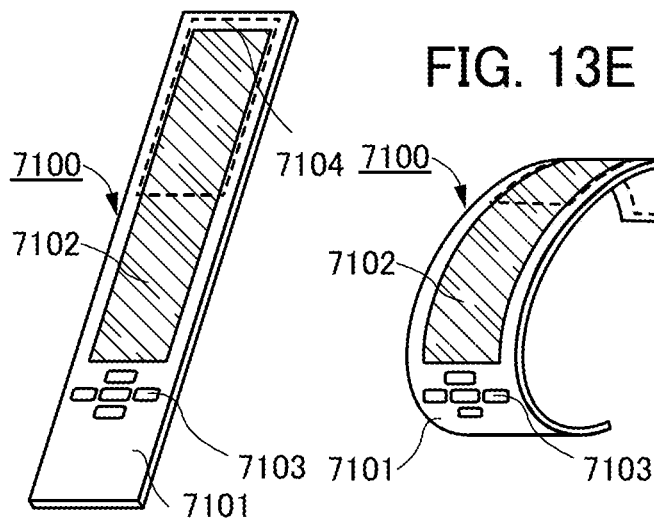
Figure 13E:
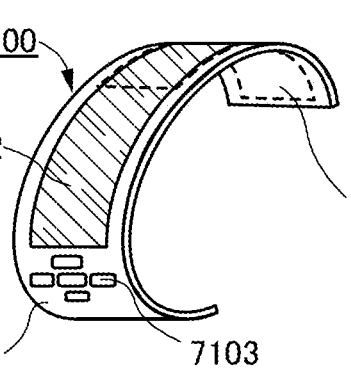
Figure 13F:
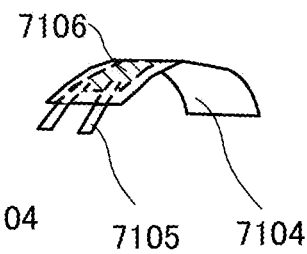
Figure 13G:
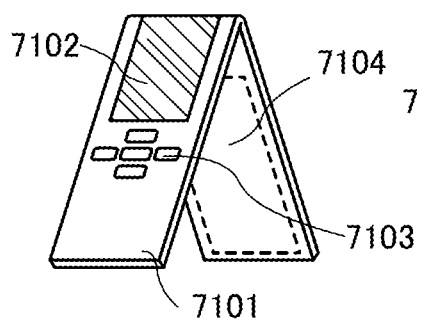
Figure 13H:
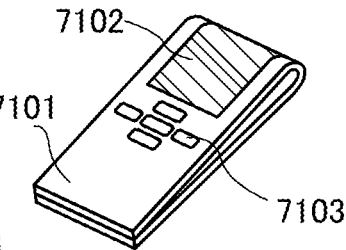

FIG. 13D illustrates an example of a mobile phone that can be bent. When bent to be put around a forearm, the mobile phone can be used as a bangle-type mobile phone as in FIG. 13E. A mobile phone 7100 includes a housing 7101, a display portion 7102, an operation button 7103, and a power storage device 7104. FIG. 13F illustrates the power storage device 7104 that can be bent. When the mobile phone is worn on a user's arm while the power storage device 7104 is bent, the housing changes its form and the curvature of part or the whole of the power storage device 7104 is changed. Specifically, part or the whole of the housing or the main surface of the power storage device 7104 is changed in the range of radius of curvature from 10 mm to 150 mm. Note that the power storage device 7104 includes a lead electrode 7105 that is electrically connected to a current collector 7106. For example, pressing is performed to form a plurality of projections and depressions on a surface of the film serving as the exterior body of the power storage device 7104, and thus high reliability is retained even when the power storage device 7104 is bent many times with different curvatures. The mobile phone 7100 may further be provided with a slot for insertion of a SIM card, a connector portion for connecting a USB device such as a USB memory, and the like. When a center portion of the mobile phone illustrated in FIG. 13D is folded, a form illustrated in FIG. 13G can be obtained. When a center portion of the mobile phone is further folded so that end portions of the mobile phone overlap with each other as illustrated in FIG. 13H, the mobile phone can be reduced in size so as to be put in, for example, a pocket of clothes a user wears. As described above, the mobile phone illustrated in FIG. 13D can be changed in form in more than one ways, and it is desirable that at least the housing 7101, the display portion 7102, and the power storage device 7104 have flexibility in order to change the form of the mobile phone. Furthermore, it is preferable that a buffer layer be provided between the housing 7101 and the display portion 7102, between the housing 7101 and the power storage device 7104, or between the display portion 7102 and the power storage device 7104.

Note that a content (or may be part of the content) described in one embodiment may be applied to, combined with, or replaced by a different content (or may be part of the different content) described in the embodiment and/or a content (or may be part of the content) described in one or a plurality of different embodiments.

Note that in each embodiment, a content described in the embodiment is a content described with reference to a variety of diagrams or a content described with a text described in the specification.

Note that by combining a diagram (or may be part of the diagram) illustrated in one embodiment with another part of the diagram, a different diagram (or may be part of the different diagram) illustrated in the embodiment, and/or a diagram (or may be part of the diagram) illustrated in one or a plurality of different embodiments, much more diagrams can be formed.

One embodiment of the invention excluding a content which is not specified in the diagrams and texts in the specification can be constituted. Alternatively, when the range of a value that is defined by the maximum and minimum values is described, the range is appropriately narrowed or part of the range is removed, whereby one embodiment of the invention excluding part of the range can be constituted. In this manner, it is possible to specify the technical scope of one embodiment of the present invention so that a conventional technology is excluded, for example.

As a specific example, a diagram of a circuit including a first transistor to a fifth transistor is illustrated. In that case, it can be specified that the circuit does not include a sixth transistor in the invention. It can be specified that the circuit does not include a capacitor in the invention. It can be specified that the circuit does not include a sixth transistor with a particular connection structure in the invention. It can be specified that the circuit does not include a capacitor with a particular connection structure in the invention. For example, it can be specified that a sixth transistor whose gate is connected to a gate of the third transistor is not included in the invention. For example, it can be specified that a capacitor whose first electrode is connected to the gate of the third transistor is not included in the invention.

As another specific example, a description of a value, "a voltage is preferably higher than or equal to 3 V and lower than or equal to 10 V" is given. In that case, for example, it can be specified that the case where the voltage is higher than or equal to −2 V and lower than or equal to 1 V is excluded from one embodiment of the invention. For example, it can be specified that the case where the voltage is higher than or equal to 13 V is excluded from one embodiment of the invention. Note that, for example, it can be specified that the voltage is higher than or equal to 5 V and lower than or equal to 8 V in the invention. For example, it can be specified that the voltage is approximately 9 V in the invention. For example, it can be specified that the voltage is higher than or equal to 3 V and lower than or equal to 10 V but is not 9 V in the invention. Note that even when the description "a value is preferably in a certain range" or "a value preferably satisfies a certain condition" is given, the value is not limited to the description. In other words, a description of a value that includes a term "preferable", "preferably", or the like does not necessarily limit the value.

As another specific example, a description of a value, "a voltage is preferred to be 10 V" is given. In that case, for example, it can be specified that the case where the voltage is higher than or equal to −2 V and lower than or equal to 1 V is excluded from one embodiment of the invention. For example, it can be specified that the case where the voltage is higher than or equal to 13 V is excluded from one embodiment of the invention.

As another specific example, a description "a film is an insulating film" is given to describe properties of a material. In that case, for example, it can be specified that the case where the insulating film is an organic insulating film is excluded from one embodiment of the invention. For example, it can be specified that the case where the insulating film is an inorganic insulating film is excluded from one embodiment of the invention. For example, it can be specified that the case where the insulating film is a conductive film is excluded from one embodiment of the invention. For example, it can be specified that the case where the insulating film is a semiconductor film is excluded from one embodiment of the invention.

As another specific example, the description of a stacked structure, "a film is provided between an A film and a B film" is given. In that case, for example, it can be specified that the case where the film is a stacked film of four or more layers is excluded from the invention. For example, it can be specified that the case where a conductive film is provided between the A film and the film is excluded from the invention.

Note that various people can implement one embodiment of the invention described in this specification and the like. However, different people may be involved in the implementation of the invention. For example, in the case of a transmission/reception system, the following case is possible: Company A manufactures and sells transmitting devices, and Company B manufactures and sells receiving devices. As another example, in the case of a light-emitting device including a transistor and a light-emitting element, the following case is possible: Company A manufactures and sells semiconductor devices including transistors, and Company B purchases the semiconductor devices, provides light-emitting elements for the semiconductor devices, and completes light-emitting devices.

In such a case, one embodiment of the invention can be constituted so that a patent infringement can be claimed against each of Company A and Company B. In other words, one embodiment of the invention can be constituted so that only Company A implements the embodiment, and another embodiment of the invention can be constituted so that only Company B implements the embodiment. One embodiment of the invention with which a patent infringement can be claimed against Company A or Company B is clear and can be regarded as being disclosed in this specification or the like. For example, in the case of a transmission/reception system, even when this specification or the like does not include a description of the case where a transmitting device is used alone or the case where a receiving device is used alone, one embodiment of the invention can be constituted by only the transmitting device and another embodiment of the invention can be constituted by only the receiving device. Those embodiments of the invention are clear and can be regarded as being disclosed in this specification or the like. Another example is as follows: in the case of a light-emitting device including a transistor and a light-emitting element, even when this specification or the like does not include a description of the case where a semiconductor device including the transistor is used alone or the case where a light-emitting device including the light-emitting element is used alone, one embodiment of the invention can be constituted by only the semiconductor device including the transistor and another embodiment of the invention can be constituted by only the light-emitting device including the light-emitting element. Those embodiments of the invention are clear and can be regarded as being disclosed in this specification or the like.

Note that in this specification and the like, it might be possible for those skilled in the art to constitute one embodiment of the invention even when portions to which all the terminals of an active element (e.g., a transistor or a diode), a passive element (e.g., a capacitor or a resistor), or the like are connected are not specified. In other words, one embodiment of the invention can be clear even when connection portions are not specified. Furthermore, in the case where a connection portion is disclosed in this specification and the like, it can be determined that one embodiment of the invention in which a connection portion is not specified is disclosed in this specification and the like, in some cases. In particular, in the case where the number of portions to which the terminal is connected might be plural, it is not necessary to specify the portions to which the terminal is connected. Therefore, it might be possible to constitute one embodiment of the invention by specifying only portions to which some of terminals of an active element (e.g., a transistor or a diode), a passive element (e.g., a capacitor or a resistor), or the like are connected.

Note that in this specification and the like, it might be possible for those skilled in the art to specify the invention when at least the connection portion of a circuit is specified. Alternatively, it might be possible for those skilled in the art to specify the invention when at least a function of a circuit is specified. In other words, when a function of a circuit is specified, one embodiment of the present invention can be clear. Furthermore, it can be determined that one embodiment of the present invention whose function is specified is disclosed in this specification and the like. Therefore, when a connection portion of a circuit is specified, the circuit is disclosed as one embodiment of the invention even when a function is not specified, and one embodiment of the invention can be constituted. Alternatively, when a function of a circuit is specified, the circuit is disclosed as one embodiment of the invention even when a connection portion is not specified, and one embodiment of the invention can be constituted.

Note that in this specification and the like, in a diagram or a text described in one embodiment, it is possible to take out part of the diagram or the text and constitute one embodiment of the invention. Thus, in the case where a diagram or a text related to a certain portion is described, the context taken out from part of the diagram or the text is also disclosed as one embodiment of the invention, and one embodiment of the invention can be constituted. The embodiment of the present invention is clear. Therefore, for example, in a diagram or text in which one or more active elements (e.g., transistors or diodes), wirings, passive elements (e.g., capacitors or resistors), conductive layers, insulating layers, semiconductor layers, organic materials, inorganic materials, components, devices, operating methods, manufacturing methods, or the like are described, part of the diagram or the text is taken out, and one embodiment of the invention can be constituted. For example, from a circuit diagram in which N circuit elements (e.g., transistors or capacitors; N is an integer) are provided, it is possible to constitute one embodiment of the invention by taking out M circuit elements (e.g., transistors or capacitors; M is an integer, where M<N). As another example, it is possible to constitute one embodiment of the invention by taking out M layers (M is an integer, where M<N) from a cross-sectional view in which N layers (N is an integer) are provided. As another example, it is possible to constitute one embodiment of the invention by taking out M elements (M is an integer, where M<N) from a flow chart in which N elements (N is an integer) are provided. For another example, it is possible to take out some given elements from a sentence "A includes B, C, D, E, or F" and constitute one embodiment of the invention, for example, "A includes B and E", "A includes E and F", "A includes C, E, and F", or "A includes B, C, D, and E".

Note that in the case where at least one specific example is described in a diagram or a text described in one embodiment in this specification and the like, it will be readily appreciated by those skilled in the art that a broader concept of the specific example can be derived. Therefore, in the diagram or the text described in one embodiment, in the case where at least one specific example is described, a broader concept of the specific example is disclosed as one embodiment of the invention, and one embodiment of the invention can be constituted. The embodiment of the invention is clear.

Note that in this specification and the like, a content described in at least a diagram (which may be part of the diagram) is disclosed as one embodiment of the invention, and one embodiment of the invention can be constituted. Therefore, when a certain content is described in a diagram, the content is disclosed as one embodiment of the invention even when the content is not described with a text, and one embodiment of the invention can be constituted. In a similar manner, part of a diagram, which is taken out from the diagram, is disclosed as one embodiment of the invention, and one embodiment of the invention can be constituted. The embodiment of the present invention is clear.

EXPLANATION OF REFERENCE

1: FPC, 2: FPC, 14: window portion, 16: base, 16a: barrier film, 16b: base, 16c: resin layer, 17: protective base, 17p: protective layer, 19: sensing circuit, 20U: sensing unit, 21: electrode, 22: electrode, 23: insulating layer, 50: film, 51: film, 52: film, 53: embossing roll, 54: roll, 55: embossing roll, 56: embossing roll, 57: embossing roll, 58: direction of movement, 100: input device, 101: holding structure body, 102: display portion, 103: secondary battery, 104: cover, 107: control board, 300: charger, 410: film, 411: film, 412: positive electrode current collector, 413: separator, 414: negative electrode current collector, 415: sealing layer, 416: lead electrode, 417: thermocompression-bonded region, 418: positive electrode active material layer, 419: negative electrode active material layer, 420: electrolyte solution, 430: adhesive layer, 500: input/output device, 501: display portion, 502: pixel, 502B: sub-pixel, 502G: sub-pixel, 502R: sub-pixel, 502t: transistor, 503c: capacitor, 503g: scan line driver circuit, 503t: transistor, 510: substrate, 510a: insulating layer, 510b: substrate, 510c: adhesive layer, 511: wiring, 519: terminal, 521: insulating film, 528: partition wall, 550R: light-emitting element, 560: sealing layer, 567p: anti-reflective layer, 580R: light-emitting module, 800: finger, 801: buffer layer, 802: buffer layer, 803: buffer layer, 804: lead electrode, 810: connection portion, 813: protective film, 814: input/output connector, 815: antenna, 816: power supply control circuit, 817: communication device, 818: wiring, 819: FPC, 820a: IC, 820b: IC, 820c: IC, 7100: mobile phone, 7101: housing: 7102: display portion, 7103: operation button, 7104: power storage device, 7105: lead electrode, 7106: current collector, 7400: mobile phone, 7401: housing, 702: display portion, 7403: operation button, 7404: external connection port, 7405: speaker, 7406: microphone, 7407: power storage device, 7408: lead electrode, 7409: current collector.

This application is based on Japanese Patent Application serial no. 2014-050855 filed with Japan Patent Office on Mar. 13, 2014, the entire contents of which are hereby incorporated by reference.

The invention claimed is:

1. An electronic device comprising:
a first body having a curved portion;
a secondary battery overlapping with the first body;
a control board electrically connected to the secondary battery;
a display portion having a curved portion over the control board; and
a flexible printed circuit electrically connected to the display portion,
wherein a radius of curvature of a front surface of the display portion is larger than a radius of curvature of a rear surface of the display portion,
wherein the front surface of the display portion is a display surface of the display portion, and
wherein the flexible printed circuit is folded from the front surface of the display portion toward the rear surface of the display portion.

2. The electronic device according to claim 1, wherein the secondary battery has a curved portion.

3. The electronic device according to claim 1, further comprising a storage device mounted on the control board.

4. The electronic device according to claim 1, wherein the curved portion of the first body and the curved portion of the display portion overlap each other.

5. An electronic device comprising:
a first body having a curved portion;
a secondary battery overlapping with the first body;
a control board electrically connected to the secondary battery;
a display portion having a curved portion over the control board; and
a flexible printed circuit electrically connected to the display portion,
wherein a radius of curvature of a front surface of the display portion is larger than a radius of curvature of a rear surface of the display portion,
wherein the front surface of the display portion is a display surface of the display portion, wherein the flexible printed circuit is folded from the front surface of the display portion toward the rear surface of the display portion, and wherein the display portion comprises a light-emitting element and a transistor.

6. The electronic device according to claim 5, wherein the secondary battery has a curved portion.

7. The electronic device according to claim 5, further comprising a storage device mounted on the control board.

8. The electronic device according to claim 6, wherein the curved portion of the first body and the curved portion of the display portion overlap each other.

9. An electronic device comprising:
a first body having a curved portion;
a secondary battery overlapping with the first body;
a control board electrically connected to the secondary battery;
a protective film over the control board;
a display portion having a curved portion over the control board; and
a flexible printed circuit electrically connected to the display portion, wherein a radius of curvature of a front surface of the display portion is larger than a radius of curvature of a rear surface of the display portion, wherein the front surface of the display portion is a display surface of the display portion, wherein the flexible printed circuit is folded from the front surface of the display portion toward the rear surface of the display portion, wherein the display portion comprises a light-emitting element and a transistor, and wherein the protective film has an opening to pass the flexible printed circuit therethrough.

10. The electronic device according to claim 9, wherein the secondary battery has a curved portion.

11. The electronic device according to claim 9, further comprising a storage device mounted on the control board.

12. The electronic device according to claim 9, wherein the curved portion of the first body and the curved portion of the display portion are overlapped with each other.

* * * * *